US008707173B2

(12) United States Patent
Moore et al.

(10) Patent No.: US 8,707,173 B2
(45) Date of Patent: Apr. 22, 2014

(54) SYSTEMS AND METHODS FOR RENDERING MEDIA

(75) Inventors: Michael R. Moore, Folsom, CA (US); Daniel A. Kaye, Folsom, CA (US); Kenneth A. Turcotte, Folsom, CA (US); Randy J. Jongens, Folsom, CA (US); Michael D. Wang-Helmke, Carmichael, CA (US); Peter A. Tjeerdsma, Fair Oaks, CA (US); Christopher H. Davey, Sacramento, CA (US); Daniel N. Sashko, Roseville, CA (US)

(73) Assignee: Visan Industries, Folsom, CA (US)

( * ) Notice: Subject to any disclaimer, the term of this patent is extended or adjusted under 35 U.S.C. 154(b) by 1129 days.

(21) Appl. No.: 12/156,321

(22) Filed: May 30, 2008

(65) Prior Publication Data

US 2008/0301546 A1 Dec. 4, 2008

Related U.S. Application Data

(60) Provisional application No. 60/932,853, filed on May 31, 2007.

(51) Int. Cl.
*G06F 17/00* (2006.01)

(52) U.S. Cl.
USPC ............ 715/273; 715/788; 715/800; 715/801

(58) Field of Classification Search
USPC ................................ 715/273, 788, 800, 801
See application file for complete search history.

(56) References Cited

U.S. PATENT DOCUMENTS

| | | | | |
|---|---|---|---|---|
| 4,835,712 | A * | 5/1989 | Drebin et al. | 345/423 |
| 5,465,213 | A | 11/1995 | Ross | |
| 5,544,306 | A * | 8/1996 | Deering et al. | 345/545 |
| 5,644,661 | A * | 7/1997 | Smith et al. | 382/300 |
| 6,139,152 | A * | 10/2000 | Ghahramani | 351/243 |
| 6,185,589 | B1 * | 2/2001 | Votipka | 715/206 |
| 6,389,467 | B1 | 5/2002 | Eyal | |
| 6,392,665 | B1 | 5/2002 | Argabright et al. | |
| 6,476,858 | B1 * | 11/2002 | Ramirez Diaz et al. | 348/159 |
| 6,549,922 | B1 | 4/2003 | Srivastava et al. | |
| 6,583,799 | B1 | 6/2003 | Manolis et al. | |
| 6,587,596 | B1 * | 7/2003 | Haeberli | 382/283 |

(Continued)

OTHER PUBLICATIONS

Deitel et al., Java How to Program; 2002; Prentice Hall; Fourth Edition; p. 261.*

(Continued)

*Primary Examiner* — Andrew Dyer
(74) *Attorney, Agent, or Firm* — Meyer IP Law Group

(57) ABSTRACT

Methods and systems are provided for maintaining the aspect ratio of an image in the form of a graphic element or a photograph on a printed product in a theme collage. The aspect ratio of each image in the theme collage is maintained independent of any aspect ratio or resolution of the theme collage. Other methods provide for maintaining the resolution of a graphic element on a printed product in a theme collage using any desired combination of bitmap or vector based graphic data and alpha data when rendering the graphic element. An exemplary system may include one or more modules for determining the size of an image on a page while maintaining an aspect ratio of the image, displaying the image, receiving graphic data for the image, receiving alpha-transparency data for the image, and changing the image appearance according to a rendering parameter.

25 Claims, 36 Drawing Sheets

(56) References Cited

U.S. PATENT DOCUMENTS

| | | | | |
|---|---|---|---|---|
| 6,665,090 | B1 * | 12/2003 | Hall et al. | 358/1.18 |
| 6,665,573 | B1 * | 12/2003 | Blackman | 700/116 |
| 6,704,733 | B2 | 3/2004 | Clark et al. | |
| 6,734,880 | B2 * | 5/2004 | Chang et al. | 715/738 |
| 6,769,096 | B1 | 7/2004 | Kuppusamy et al. | |
| 6,826,727 | B1 * | 11/2004 | Mohr et al. | 715/235 |
| 6,941,276 | B2 * | 9/2005 | Haeberli | 705/26.5 |
| 6,956,589 | B2 * | 10/2005 | Lipsky et al. | 345/667 |
| 6,973,222 | B2 * | 12/2005 | Haeberli | 382/283 |
| 7,016,869 | B1 * | 3/2006 | Haeberli | 705/27.2 |
| 7,019,864 | B2 | 3/2006 | Delhoune et al. | |
| 7,090,253 | B2 | 8/2006 | Phillips et al. | |
| 7,117,256 | B1 * | 10/2006 | Blinn | 709/219 |
| 7,146,575 | B2 | 12/2006 | Manolis et al. | |
| 7,154,631 | B2 * | 12/2006 | Gonzalez et al. | 358/1.2 |
| 7,230,628 | B1 | 6/2007 | Haeberli | |
| 7,269,800 | B2 | 9/2007 | Manolis et al. | |
| 7,432,936 | B2 | 10/2008 | Woodbury, Jr. | |
| 7,489,324 | B2 * | 2/2009 | Royal et al. | 345/667 |
| 7,689,064 | B2 * | 3/2010 | Miksovsky et al. | 382/294 |
| 2002/0040375 | A1 * | 4/2002 | Simon et al. | 707/517 |
| 2002/0099696 | A1 | 7/2002 | Prince | |
| 2002/0099731 | A1 | 7/2002 | Abajian | |
| 2002/0123942 | A1 | 9/2002 | Bridges, Jr. et al. | |
| 2002/0140702 | A1 | 10/2002 | Koller | |
| 2002/0178950 | A1 | 12/2002 | Delhoune et al. | |
| 2003/0009469 | A1 | 1/2003 | Platt et al. | |
| 2003/0052909 | A1 | 3/2003 | Mo et al. | |
| 2003/0072486 | A1 | 4/2003 | Loui et al. | |
| 2003/0110503 | A1 | 6/2003 | Perkes | |
| 2003/0173771 | A1 | 9/2003 | Phillips et al. | |
| 2004/0017390 | A1 | 1/2004 | Knowlton et al. | |
| 2004/0019608 | A1 | 1/2004 | Obrador | |
| 2004/0090468 | A1 | 5/2004 | Cruikshank et al. | |
| 2004/0119726 | A1 * | 6/2004 | Li | 345/629 |
| 2004/0160624 | A1 | 8/2004 | Elgar et al. | |
| 2004/0199507 | A1 | 10/2004 | Tawa, Jr. | |
| 2004/0267616 | A1 | 12/2004 | Kargman | |
| 2005/0102624 | A1 | 5/2005 | McIntyre | |
| 2005/0165795 | A1 | 7/2005 | Myka et al. | |
| 2005/0190280 | A1 | 9/2005 | Haas et al. | |
| 2005/0210413 | A1 | 9/2005 | Quek et al. | |
| 2005/0210414 | A1 | 9/2005 | Angiulo et al. | |
| 2006/0064716 | A1 | 3/2006 | Sull et al. | |
| 2006/0197963 | A1 * | 9/2006 | Royal et al. | 358/1.2 |
| 2007/0024631 | A1 * | 2/2007 | Cazier et al. | 345/581 |
| 2007/0106690 | A1 | 5/2007 | Denniston et al. | |
| 2008/0089612 | A1 | 4/2008 | Isomura | |
| 2009/0051946 | A1 * | 2/2009 | Hibi | 358/1.9 |

OTHER PUBLICATIONS

Macromedia Captivate 1.0: Using Captivate, User Guide [online], Macromedia, Inc., Apr. 2005, pp. 17-57 and 215-220.

Altman, R., PowerPoint 2000/98: Visual QuickStart Guide, Peachpit Press, May 1999, pp. 2, 46, 70 and 71.

Breeze 5 Integration Guide, User Guide [online], Macromedia, Inc., May 2005, 56 pages.

Sun, L. et al., Flipper: a New Method of Digital Document Navigation, 2005, pp. 2001-2004.

Wikipedia, Streaming Media, May 17, 2005, http://en.wikipedia.org/w/index.php?title=Streaming_media&oldid=13971634, 6 pages.

WebHostingTalk, Detect Internet Connection Type with PHP, Oct. 2004, http://www.webhostingtalk.com/archive/index.php/t-331520.html, 3 pages.

VelocityReviews, Auto Detection of Screen Resolution, Feb. 2005, http://www.velocityreviews.com/forums/t97495-auto-detection-of-screen-resolution.html, 3 pages.

RealNetworks, http://www.service.real.com/help/library/guides/ProductionGuide/prodguide/htmfiles/server.htm#69951, 2004, Chapter 21, 27 pages.

Inigo Surguy, Client-Side Image Generation With SVG and XSLT, http://web.archive.org/web/20040219193956/http://www.surguy.net/articles/client-side-svg.xml, Feb. 2004, 7 pages.

San Francisco State University, Mac OS The Desktop Operating System for Macintosh Computers, http://userwww.sfsu.edu/~training/mac%20os.pdf, Mar. 2004, 3 pages.

* cited by examiner

SYSTEMS AND METHODS FOR RENDERING MEDIA

CROSS-REFERENCE TO RELATED APPLICATIONS

This application claims the benefit and priority of U.S. Provisional Patent Application 60/932,853 filed May 31, 2007 and entitled "Systems and Methods for Rendering Media." The disclosure of the above patent application is incorporated herein by reference. This application also incorporates by reference the disclosure of U.S. patent application Ser. No. 11/711,550 filed Feb. 26, 2007 and entitled "Systems and Methods for Dynamically Designing a Product with Digital Content." This application also incorporates by reference U.S. patent application Ser. No. 11/437,207 filed May 19, 2006 entitled "Systems and Methods for Web Server Based Media Production." This application is related to U.S. patent application Ser. No. 12/156,345, filed May 30, 2008, entitled "Data Management For Media Production," which is incorporated herein by reference.

BACKGROUND

1. Field of the Invention

The present invention relates generally to printed media production and more particularly to systems and methods for maintaining the aspect ratio and resolution of an image printed on products in a theme collage.

2. Description of Related Art

Conventionally, people have utilized various types of products to edit and print media, such as digital images, graphics, text etc. With the availability of many online products to which digital media may be uploaded, many users seek personalized products having a theme collage through online retailers. A theme collage is a personalized collage of background and foreground images called graphic elements, which include decorative themes, such as background textures, borders, tiled patterns and individual decorative elements such as flowers, birthday images, and so forth, with photographs supplied by the user while creating the theme collage.

Many products have different sizes, or the relationship of the width to the height (aspect ratio) is different, which requires scaling the digital media associated with the themes in the collage artwork applied to the product. This scaling may result in a loss of integrity through changing the aspect ratio and resolution of the media reproduced onto the products. For example, stretching a graphic element, such as a background image, to fit an oblong product such as when wrapped around a photo mug may make the graphic element appear asymmetrical or otherwise distorted. To compensate, existing products tend to pre-generate multiple different versions of theme imagery for specific products such as a Photo Book, Photo Mug, or Poster, as well as for each size thereof. If a new product is introduced, an entirely new set of themes may need to be authored for that specific product resulting in additional development effort and memory, disk space and network bandwidth required to store and deploy that collection of themes.

Theme collage products may require duplication of graphic data in order to accommodate different final-product sizes and aspect ratios, as well as different design variations. A graphic element may require "flattening" to create image data that may be composited with photographs.

Compression of the digital media may also be difficult, resulting in a time consuming process. Rendering, the process of generating a digital image to have a specific appearance combining many elements, is often a time consuming process, since modern digital media may be very large, i.e., several, if not hundreds, of megabytes in size. In addition, importing an image may also be a lengthy process due to the large file size.

SUMMARY

Exemplary methods are provided for maintaining the aspect ratio and resolution of an image in the form of a graphic element or photograph printed on products in a theme collage. The aspect ratio and resolution of these images are maintained independent of an aspect ratio or resolution of the desired theme collage. Such methods include receiving a image having a creation height and a creation width, receiving a normalized value representing a desired size of the image within the theme collage, receiving a minimum of a page height or a page width, determining an image output height according to the minimum of the page height or the page width multiplied by the normalized value multiplied by the creation height, determining an image output width according to the minimum of the page height or the page width multiplied by the normalized value multiplied by the creation width, and displaying the image having the image output height and the image output width.

Further methods include receiving an offset value for shifting the image alignment either horizontally or vertically and displaying the image offset to an amount proportional to the offset value and the image width or height, respectively. The offset may be positive or negative (e.g. to either side, up or down), or a combination of a horizontal and vertical offset.

Other methods include receiving a horizontal or vertical tiling option for the image, determining a repetition value based on the width or height of the image, respectively, and tiling the image. Additional methods provide for rotating the image according to a received image rotation value, resizing the image on the basis of a received proportional resizing value, changing the color of the image, changing the transparency of the image, either wholly or progressing as a gradient across any axis. Another method provides for adding a randomizing function to any of these methods. Yet another method provides for a method of saving the graphic data and alpha data of a graphic image in a single separate file for use in more than one theme, or for individual access by the user. In addition, some embodiments provide for maintaining the apparent resolution of the graphic element as it resized manually within a collage by the user or automatically when otherwise rendered to a different product.

Systems are provided for maintaining the aspect ratio and resolution of an image in the form of a graphic element or photograph printed on products in a theme collage. The aspect ratio and resolution are maintained independent of an aspect ratio or resolution of the theme collage. Exemplary systems may include one or more modules for determining the size of an image on a page while maintaining an aspect ratio of the image, displaying the image, receiving graphic data of the image, receiving alpha-transparency data of the image, and changing the image appearance according to a rendering parameter.

Other embodiments may include a computer readable medium having a program executable by a processor for performing one or more of these methods, or comprising one or more of these systems.

DETAILED DESCRIPTION

The present invention provides systems and methods for maintaining the aspect ratio and resolution of an image on a printed product. The image may be a graphic element representation of an object used as an artistic compliment to a digital image, or a photograph. The graphic element may be in the background or in the foreground to another image. Examples of a graphic element include a flower, a dot, a vertical line, a square, a diamond, a solid figure, a hollow figure, crinkled paper, a building, a statute, a curlicue, or an animal. Other graphic elements are possible but are not listed here. A graphic element may be grouped into a layer with another graphic element. A graphic element may also be "tiled" vertically and/or horizontally for use as a repeating border or texture.

A digital image may be a digital photograph in a jpg format, a bitmap, or other format. Examples of a digital image include photographs from a digital camera, or a print picture (i.e., a photograph printed on paper or other media) scanned into a digital image. These formats and examples are not inclusive and do not exclude other formats (e.g., bmp, tiff, png, tga, or svg), a video still frame from a movie, etc., or other examples of a digital image.

Figure 1:
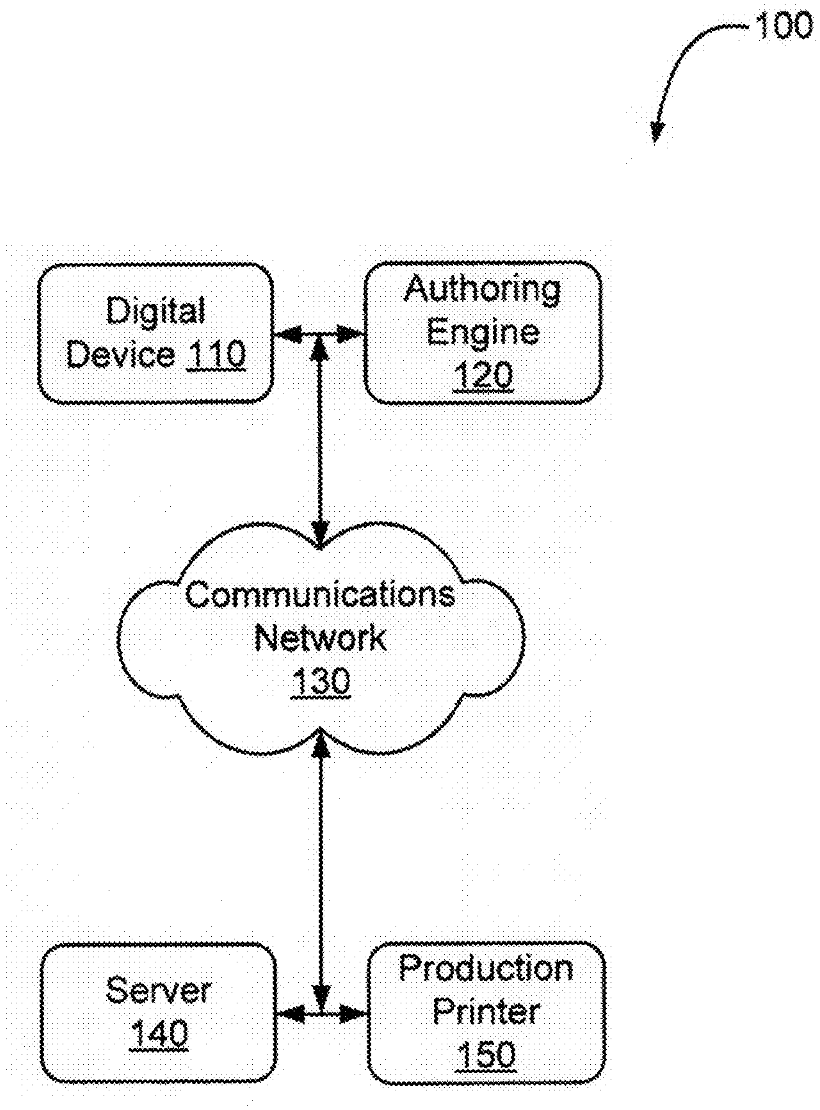
FIG. 1 is a diagram of an environment in which embodiments of the present invention may be practiced.

FIG. 1 illustrates a diagram of an exemplary environment 100 in which embodiments of the present invention may be practiced. Environment 100 includes a digital device 110 and an authoring engine 120. The digital device 110 may comprise a desktop computer, laptop computer, or any other computing device. The authoring engine 120 may be a program, an application, or another system for creating theme collages with background images, foreground images, and photographs. The authoring engine 120 may be installed on digital device 110 or on another digital device in communication with digital device 110.

The communication network 130, according to one embodiment, provides communication between the digital device 110 and the server 140. Communication network 130 may be the Internet, or other communication protocol. The server 140 provides the theme collage with graphic elements, receives the completed theme collage artwork from the digital device 110 and provides the completed theme collage artwork to the production printer 150, which prints the theme collage artwork on the printed product, i.e., a photograph album, calendar, coffee mug, etc.

Figure 2:
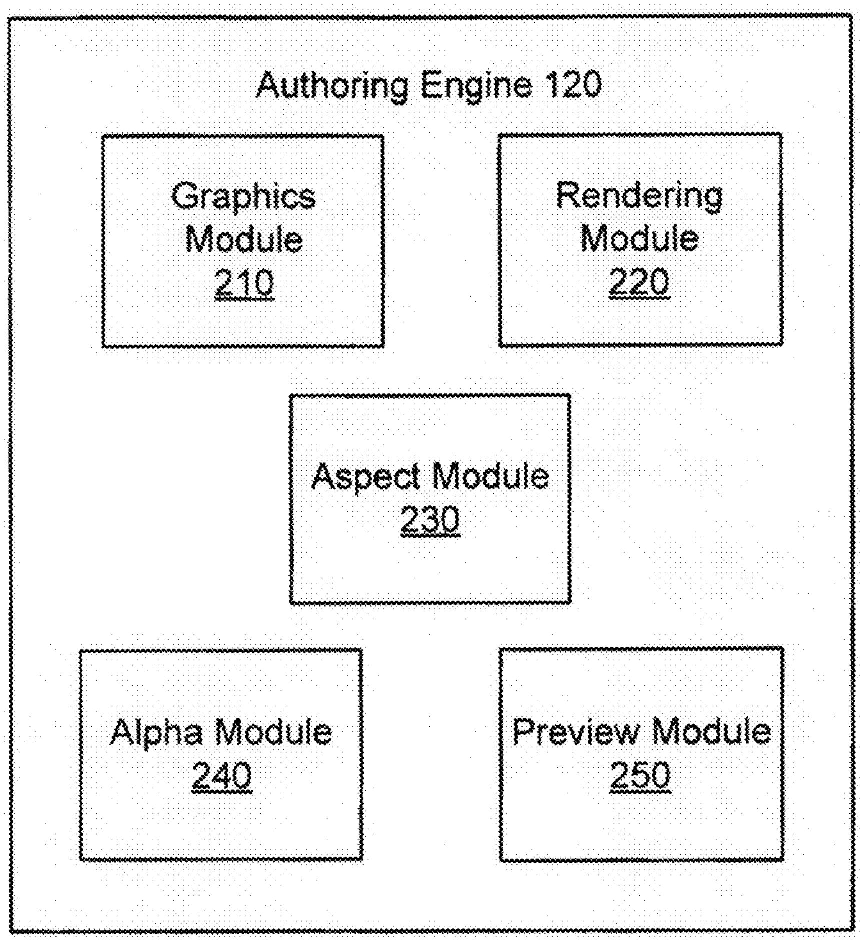
FIG. 2 is a block diagram showing an exemplary system for determining a size of an image on a page while maintaining an aspect ratio of the image independent of an aspect ratio on a page.

FIG. 2 shows an exemplary authoring engine 120 for determining the size of an image on a printed product while maintaining an aspect ratio and resolution of the image on a printed product. The authoring engine 120 may comprise a graphics module 210, a rendering module 220, an aspect module 230, an alpha module 240, and a preview module 250.

According to one embodiment, the graphics module 210 may be configured to receive and store graphic data and alpha-transparency data of an image, (e.g., a graphic element) in a digital file and send or electronically communicate the graphic data and the alpha-transparency data of the graphic element to the rendering module 220, the aspect module 230, and/or the alpha module 240. The graphics module 210 may be further configured to combine graphic images in the form of raster images with vector cut-outs or alpha layers in a single file. This file may combine a vector graphic data or Discrete Cosine Transform (DCT) compressed bitmap graphic data, with one or more of a vector alpha, or DCT compressed raster alpha, according to some embodiments.

The rendering module 220, according to one embodiment, may be configured to receive the graphic data and alpha data of a graphic element, adjust those properties to change the appearance of the graphic element according to selected parameters in a user interface, and send or electronically communicate the graphic element to the aspect module 230 and/or the alpha module 240. Examples of rendering include shading, fogging, shadowing, flipping (horizontal or vertical), alpha (obscuring or making transparent), aligning (horizontal or vertical), shifting (offset) stretching, skewing, tiling (repeating the graphic element horizontally and/or vertically), rotating, overlaying, texture-mapping, cropping, blurring, masking (showing a repeating background object or texture only where other objects would appear behind it) and gradation (applying a render property proportionally across one or more graphic elements or digital images). Other rendering options may be performed and fall within the scope of the various embodiments contemplated here.

The aspect module 230 may be configured to receive the graphic data and the alpha data of a graphic element selected for display from the graphics module 210 and/or the rendering module 220. The aspect module 230 may also be configured to determine the size of an image on a page while maintaining an aspect ratio of the image independent of an aspect ratio of the page. As described herein, the aspect module 230 may determine the output height and output width by multiplying the minimum of the page height or page width by a received normalized value representing the desired size of the graphic element or image within the page, and then multiplying that value in parallel by the creation height or creation width, respectively, to output separate height and width values of the graphic element for displaying the graphic image on the page with an aspect ratio independent of the page aspect ratio. Examples of a graphic element in aspect independence are shown in FIGS. 3, 7 and 12-36. The aspect module 230 may also be configured to send or electronically communicate those parameters to the preview module 250.

On one embodiment, the alpha module 240 may be configured to receive an alpha (transparency) data of a graphic element selected for display from the graphics module 210 or the rendering module 220, determine the parameters for resolution independence of the graphic element, and pass those parameters to the preview module 250. Resolution independence is described in connection with FIG. 5*b*.

The preview module 250 may be configured to receive the parameters of a graphic element selected for display in the theme collage from the aspect module 230 or the alpha module 240 and to display the graphic element. The preview module 250 may provide an area for display in the preview workspace (examples of the preview workspace are shown in FIG. 7 and FIGS. 12-36) and allows arrangement of selected designed elements and photographs which are to be printed on the later selected products.

Figure 3:
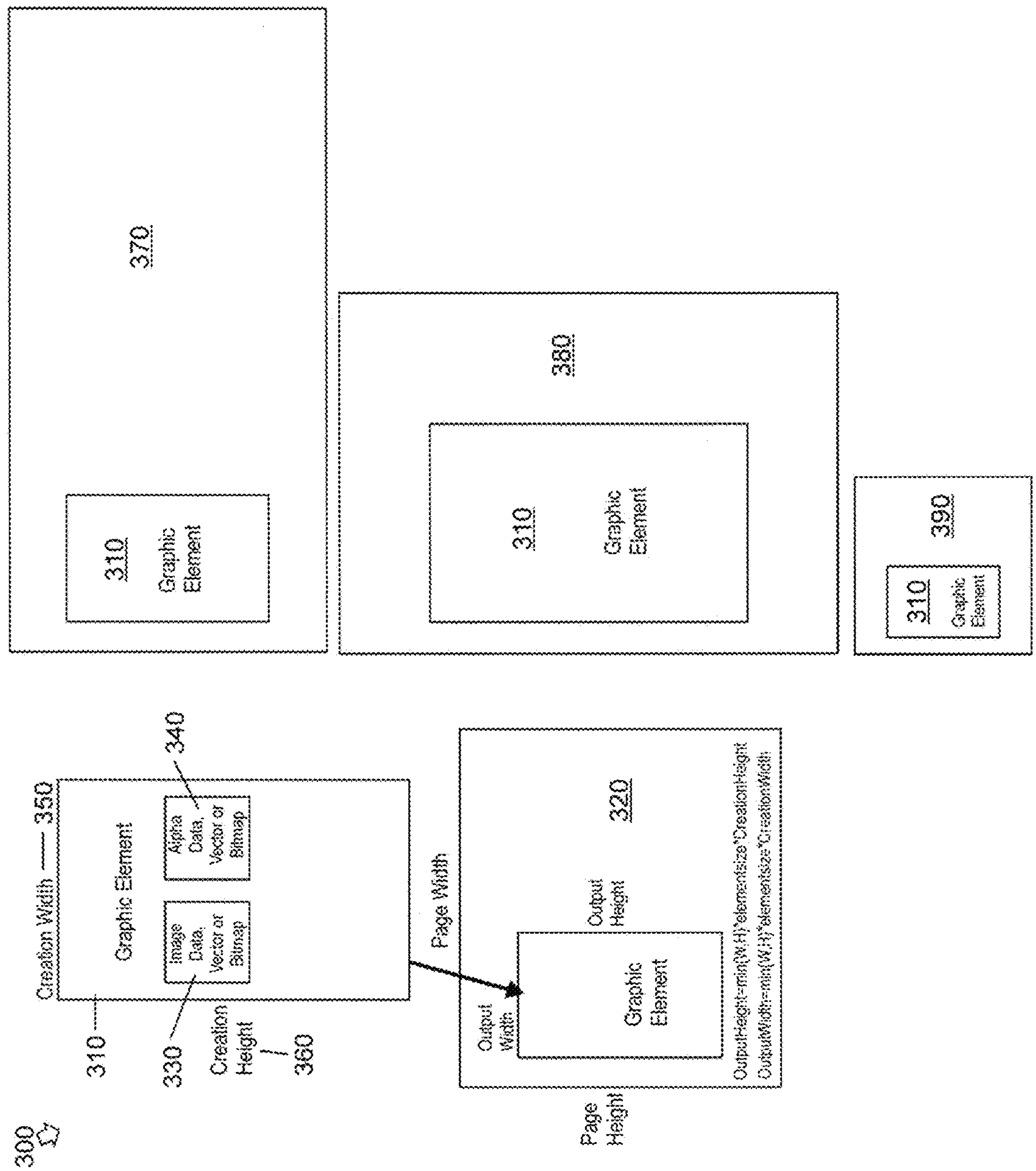
FIG. 3 is a block diagram showing an example of the exemplary system maintaining the aspect ratio and resolution of an image as the page size is changed.

FIG. 3 shows an exemplary layout 300 for maintaining the aspect ratio and resolution of an image on a printed product. The exemplary system 300 may comprise a graphic element 310 and a page 320. The graphic element 310 may be a decorative theme, such as a flower, a tile, or another decorative theme. In some embodiments, the graphic element 310 may be a photograph.

The graphic element 310 may comprise an image data 330 combined with an alpha data 340 (also known as alpha-transparency data). The image data 330 may be combined with the alpha data 340 and may be stored in a single digital file. This file format maybe called a JPEGA file.

The image data 330, also known as graphic data, may comprise a vector data. The image data 330 of the JPEGA file may contain graphic data of the image in the form of a bitmap, Discrete Cosine Transform (DCT) compressed image data (jpg), or other format for defining the shape, color or other image parameters of the graphic element 310. The image data 330 may include a creation width 350 and a creation height 360 of the graphic element 310.

The graphic element 310 may also comprise an alpha (alpha-transparency) data 340. The alpha data 340 may represent the transparency of the graphic element 310. The alpha-transparency date 340 may comprise a vector outline. The alpha data 340 may comprise Discrete Cosine Transform (DCT) compressed bitmap image data jpg), or other format for defining the shape, transparency or other image parameters of the graphic element 310.

The page 320, according to one embodiment, may be a preview workspace page of the authoring engine 120. As shown by pages 370, 380, and 390, the page 300 may be resized by handles (not shown). As shown by pages 370, 380, and 390, embodiments of the present invention maintain the aspect ratio and resolution of the graphic element 310 on each page, irrespective of whether page 320 is resized horizontally (page 370), vertically (page 380), or both horizontally and vertically (page 390).

Figure 4:
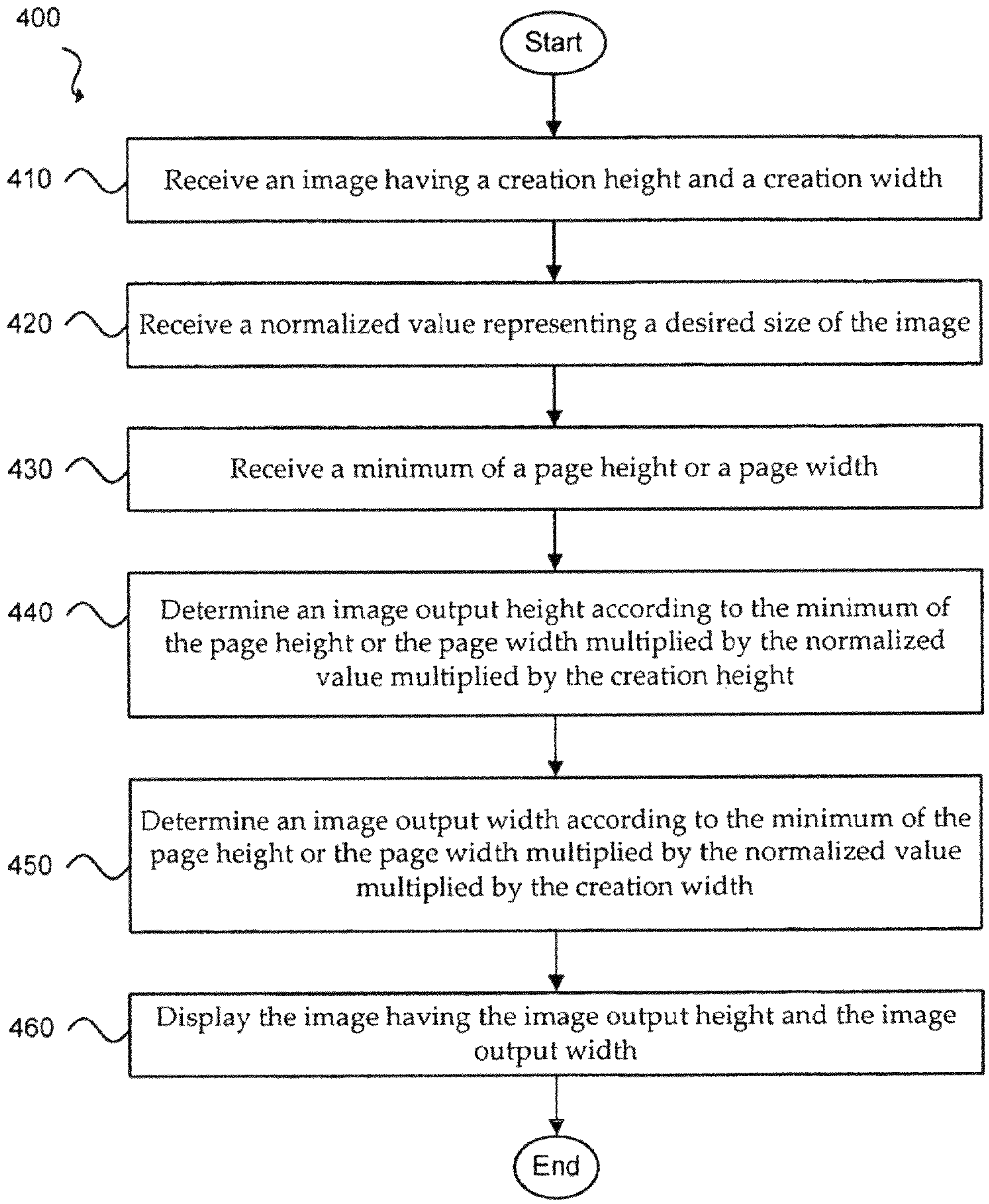
FIG. 4 is a flow chart showing an exemplary method for determining a size of an image on a page while maintaining an aspect ratio of the image independent of an aspect ratio on a page.

FIG. 4 is a flow chart showing an exemplary method for determining a size of an image on a page while maintaining an aspect ratio of the image independent of an aspect ratio on a page. In one embodiment, the output width and height of each graphic element in the collage artwork may be determined by the equations below:

"OutputHeight=min($W$,$H$) *elementsize*CreationHeight"

"OutputWidth=min($W$,$H$) *elementsize*CreationWidth"

"Elementsize" is a normalized value representing the desired proportional size of the image as it should be displayed within the page.

At step 410, the creation height and the creation width of the graphic element may be received. The creation height and the creation width may represent the original height and width of the graphic element as shown in graphic element 310 (FIG. 3).

At step 420, a normalized value may be received to adjust the size of the graphic element as a fraction of the smaller of the width or height of the graphic element. In one embodiment, the normalized value may be received from the authoring engine 120. For example, if the element size is specified as 0.25, that element may be automatically adjusted to 25% of either the width or the height of the final output, whichever is smaller. This may allow the theme collage to adapt to any aspect ratio, while each graphic element may retain its own original aspect ratio yet scale appropriately to the visual proportions of the final output image. In another example, the normalized value may be specified as 1.5, whereupon the image would be scaled to 150% of either the width or the height of the final output, whichever is smaller. This may be used to cause a background design element to "bleed" off the edges of the page, while maintaining a size relative to the overall page area but independent of the page aspect ratio, as shown in FIGS. 25-30.

At step 430, the minimum of a page height or a page width may be received. According to one embodiment, the page may be the preview workspace of the authoring engine 120. The received page height or a page width may be the page height or a page width of the preview workspace before the graphic element was placed on the preview workspace. In some embodiments, the page height or the page width may be the page height or the page width of the preview workspace after the graphic element was placed on the preview workspace, as when the page is resized after the graphic element is on the page.

At step 440, the output height of the graphic element may be determined or approximated by multiplying the minimum of the page height or the page width by the normalized value, and multiplying that product by the creation height.

At step 450, the output width of the graphic element may be determined by multiplying the minimum of the page height or the page width by the normalized value, and multiplying that product by the creation width.

At step 460, the graphic element may be displayed using the output height of the graphic element and the output width of the graphic element, thereby maintaining the same apparent aspect ratio of the graphic element.

Other methods for maintaining the aspect ratio of a graphic element may be performed and fall within the scope of the various embodiments contemplated herein. In some embodiments, the graphic element may be repositioned from its aligned position by receiving an offset value, shifting the position of graphic element by the amount of the offset value, and displaying the graphic element.

In some embodiments, the offset value may be a normalized fraction of the height or width of the graphic element. In these embodiments, the graphic element is shifted a proportional distance of the height or width of the graphic element as determined in steps 440 and 450. A shift of 0.5 of the height of the graphic element may shift the graphic element half the distance of its height. A shift of 0.25 of the width of the graphic element may shift the graphic element one-quarter the distance of its width.

In some embodiments, the offset value may be a negative number, which may shift the position of graphic element in the opposite direction that the graphic element shifts for a positive number. Thus, the position of each graphic element to the desired edge(s) may shift proportionally to the size of the graphic element, towards or away from the edge, including partially off the edge.

Other embodiments of the method may repeat the graphic element horizontally or vertically by tiling the graphic element based on the width or height, respectively, of the graphic element as determined in steps 440 and/or 450. In these embodiments, a repetition value may be determined from the image output width or height that is inversely proportional to the preview workspace width or height. The smaller the graphic element, the more tiles of the graphic element may be displayed, while more tiles may be displayed on a wider or taller page.

Other embodiments of the method may rotate the image according to a received image rotation value. A rotation value of 45 may rotate the image 45 degrees. It will be appreciated that other numerical schemes may be used.

Other embodiments of the method may proportionally size the graphic element based on a received proportional size value. A proportional size value of 0.5 may reduce the size of the graphic by one-half, i.e., the graphic element is one-half as large, while a proportional size value of 2.0 may double the size of the graphic element.

In some embodiments, the color of the graphic element may be changed. The color change may be absolute, i.e., the color changes to the color of the color code received.

These embodiments may be used singularly or in multiples. In some embodiments, a graphic element may be shifted, tiled, re-sized, rotated, or re-colored, or more than one of shifted, tiled, re-sized, rotated, and re-colored.

In some embodiments, the parameters described above may be randomized. In these embodiments, a desired randomness value may be received and multiplied by a normalized random number (from 0 to 1). This product may then be multiplied by the value for shifting, sizing, rotating, or coloring of the graphic element, and the randomized shifted, re-sized, rotated, or re-colored graphic element may be displayed.

Other embodiments of the method provide for changing the transparency (alpha) of the graphic element. In these embodiments, an alpha-transparency value may be received for displaying the image proportionally transparent according to the alpha-transparency value. An alpha-transparency value of 0.5, may make the graphic element one-half as transparent as an alpha-transparency value of 1.0.

In other embodiments, the alpha-transparency value may be applied as a gradient, i.e., the graphic element appears solid along one side and becomes progressively transparent across of the graphic element. In these embodiments, an alpha-gradient may display the graphic element as solid on the left, with the graphic element becoming progressively transparent across of the image at half-alpha (one-half transparent) on the right. This alpha-gradient may comprise a bitmap, or an algorithmic two-dimensional gradient.

In some embodiments, the graphic element may be a photograph. The photograph may be supplied by a user.

Figure 5A:
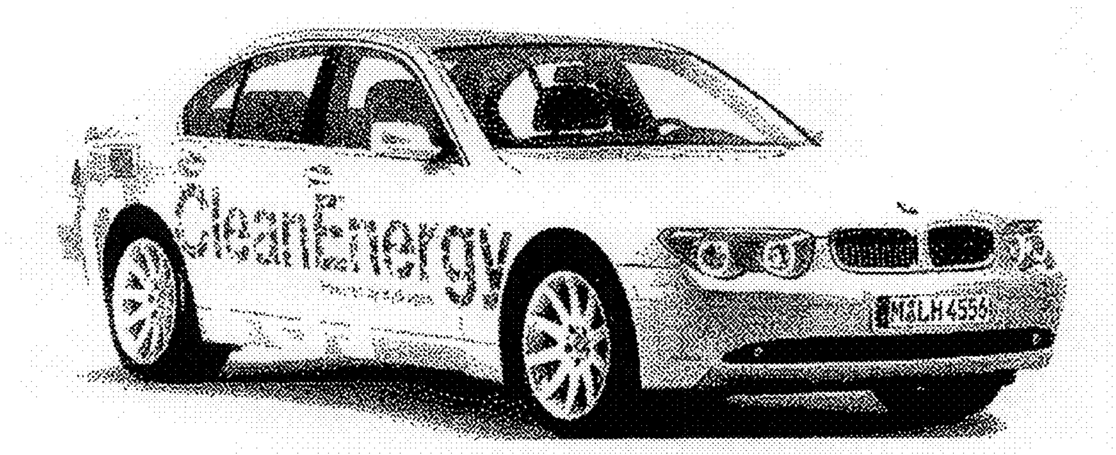
FIGS. 5*a* and 5*b* show an example of a method for maintaining image resolution on a printed product independent of the background resolution.
Figure 5B:
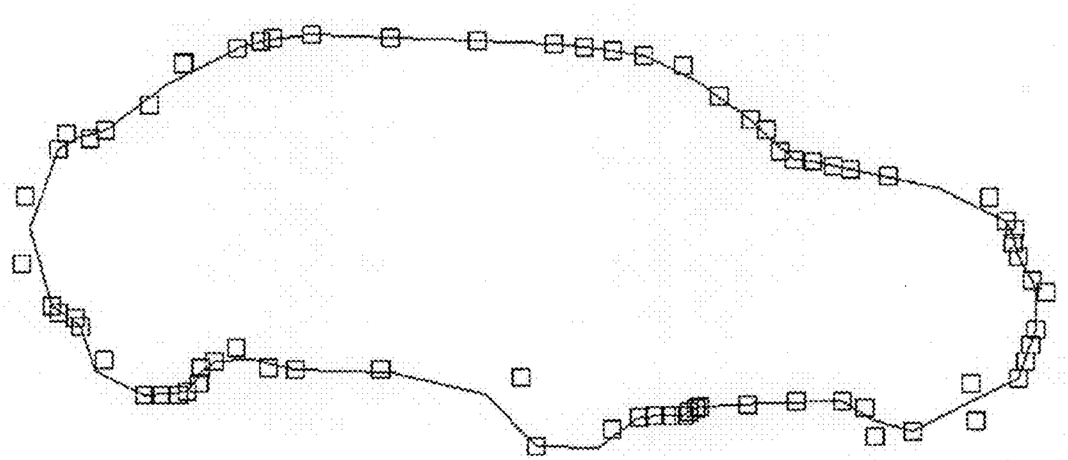

FIGS. 5*a* and 5*b* show an example of a method for achieving resolution independence of an image displayed on a page. FIG. 5*a* shows a graphic element before having a vector outline applied for resolution independence. FIG. 5*b* shows the graphic element of FIG. 5*a* with an outline applied for resolution independence. To achieve resolution independence, the vector outline edges are defined within the area of the desired bitmap pixels, so that edge scaling artifacts are not included in the output height and width of the graphic element. The raster image within the vector outline may comprise a tiled image that may be scaled up by repeating the tile and/or the raster may comprise a non-repeating image. The vector outline may be also be implemented using an algorithmic variable softness gradient along the edge of the outline.

Figure 6:
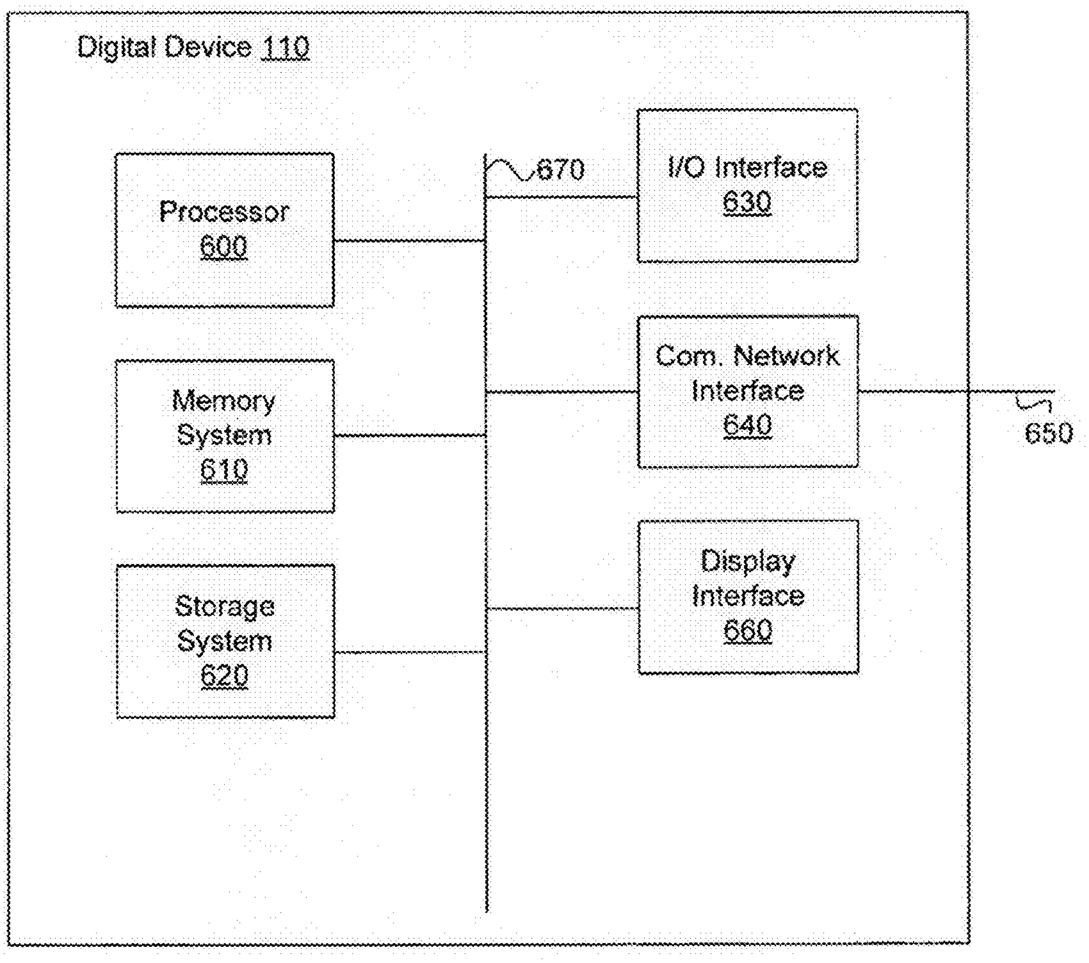
FIG. 6 is a block diagram of an exemplary system in which embodiments of the present invention may be practiced.

FIG. 6 shows an exemplary system in which embodiments of the present invention may be practiced. The digital device 110 may comprise a processor 600, a memory system 610, a storage system 620, an I/O interface 630, a communication network interface 640, a link 650, a display interface 660, and a bus 670. The processor 600 may be configured to execute executable instructions (e.g., programs). In some embodiments, the processor 600 may comprise circuitry or any processor capable of processing the executable instructions.

The memory system 610 may be any memory configured to store data. Some examples of the memory system 610 are storage devices, such as RAM or ROM. The memory system 610 may comprise a ram cache. In various embodiments, data may be stored within the memory system 610. The data within the memory system 610 may be cleared or ultimately transferred to the storage system 620.

The storage system 620 may be any storage configured to retrieve and store data. Some examples of the storage system 620 are flash drives, hard drives, optical drives, or magnetic tape. In some embodiments, the digital device 110 may include a memory system 610 in the form of RAM and/or a storage system 620 in the form of flash data. Both the memory system 610 and the storage system 620 may comprise computer readable media which may store instructions or programs that are executable by a computer processor including the processor 600.

The input/output (I/O) interface 630 may be any device that receives input from the user and output data. Examples of input/output (I/O) interface 630 may include a keyboard, mouse, touch-screen, digital tablet, etc.

The communication network interface 640 may be coupled to a network (e.g., communication network 140) via the link 650. The communication network interface 640 may support communication over an Ethernet connection, a serial connection, a parallel connection, or an ATA connection, for example. The communication network interface 640 may also support wireless communication (e.g., 802.11a/b/g/n, WiMax). It will be apparent to those skilled in the art that the communication network interface 640 may support many wired and wireless standards.

The display interface 660 may be any device that may be configured to output graphics and data to a display. The display interface 660 may be a graphics adapter.

Bus 670 may provide communication between the processor 600, the memory system 610, the storage system 620, the I/O interface 630, the communication network interface 640, the link 650, and/or the display interface 660.

The above-described functions and components may be comprised of instructions that are stored on a storage medium. The instructions may be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

Figure 7:
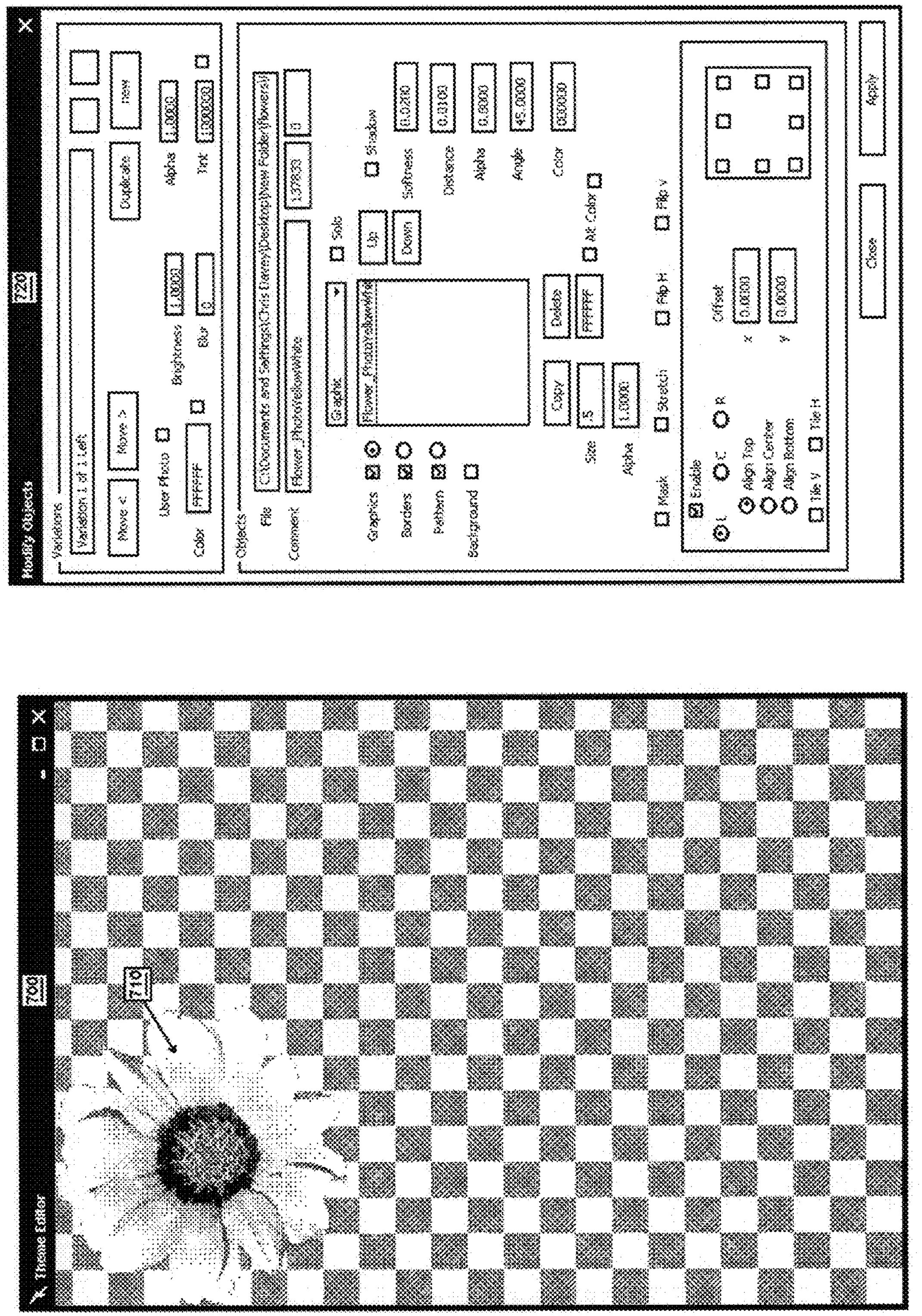
FIG. 7 is a screen shot of an exemplary workspace and interface for maintaining the aspect ratio and resolution of an image on a printed product independent of the background.

FIG. 7 shows an exemplary preview workplace 700 on the left with a graphic element (flower) 710 and the user interface 720 on the right. The preview workspace 700 may provide an area for display of the theme graphics and may allow arrangement by a designer of selected graphic elements and photographs while creating the theme. The theme may then be printed on the later selected products after the end-user has applied the theme and combined it with their own content while editing a desired product. The gray on gray checkerboard pattern of the preview workspace may provide an easily visible indication to the designer of the relative location and transparency of the graphic elements and photographs placed on the preview workspace. The user interface 720 indicates details to the designer about the rendering parameters of the graphic elements on the preview workspace 700.

FIGS. 8-12 show various screen shots of exemplary user interfaces for creating themes and making various design decisions for each graphic element within the theme.

Figure 8:
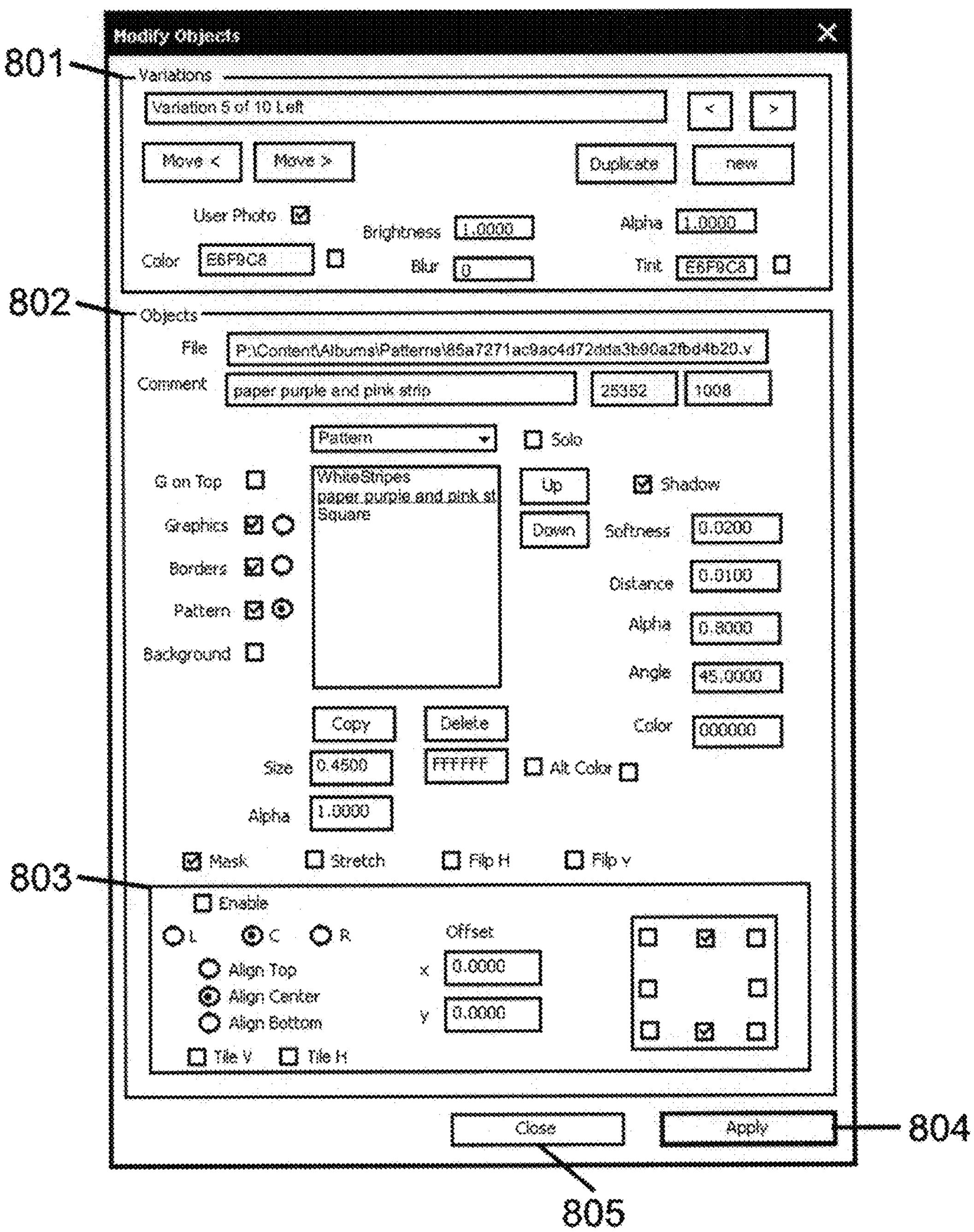
FIGS. 8-11 are screen shots of an exemplary interface for rendering graphic elements while maintaining the aspect ratio and resolution of an image on a printed product independent of the background.

FIG. 8 shows exemplary primary control groupings for theme creation. The controls are shown on the graphical user interface in the following exemplary groups:

The theme variations control group 801 allows the creation and arrangement of multiple layouts and graphical variations within the larger theme. This group may include controls that apply to the background layer of the theme variation as a whole. The individual controls in this group are described in connection with FIG. 9.

The objects and layers control group 802 may allow the selection of individual graphical objects that have been imported into the current theme variation, control a variety of rendering properties for each object, group objects into three primary layers, and arrange the depth of each object within each layer. This group also has controls to selectively display each layer or individual objects in the design preview, so that a theme designer may more easily see how the appearance of individual objects are effecting the layer or theme variation as a whole. The individual controls in this group are described in connection with FIG. 10.

The alignment and tiling control subgroup 803 operates on the object selected in the objects and layers control group.

The apply button 804 may be used to apply changes entered into any of the numerical control boxes. Some checkbox and radio button controls may be automatically applied without the need for activating this button.

The close button 805 may be used to close the panel shown.

Figure 9:
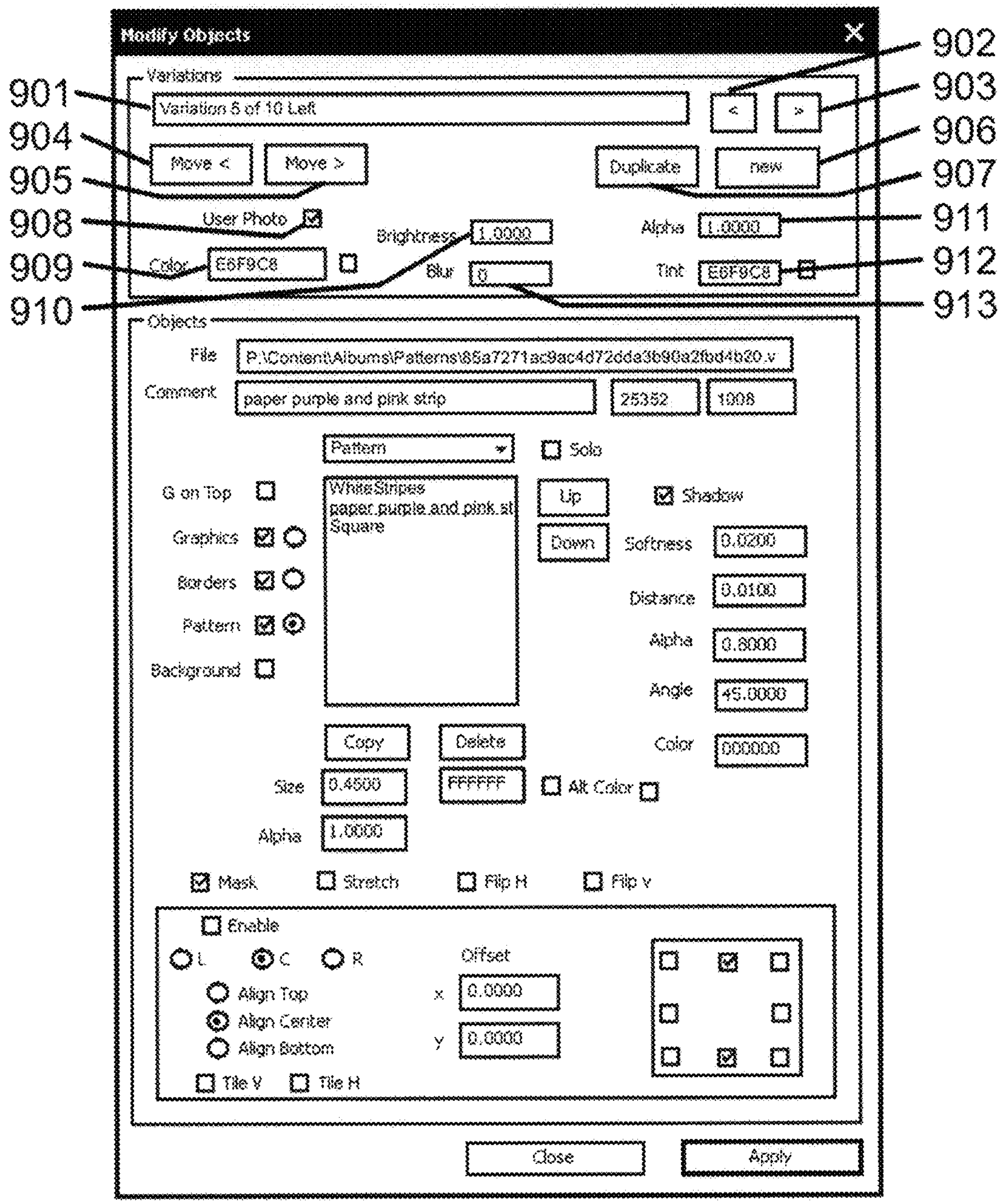

FIG. 9 shows an exemplary theme variations control group.

The currently active variation 901 show which variation is currently active. For example, the currently active variation 901 may display "Left" or "Right" to show which side of a two-page spread the variation may appear when used to create a multi-page product such as a bound book or folded brochure.

The previous 902 and next 903 buttons may let a theme designer step through existing variations.

The move buttons 904 and 905 may allow a theme designer to move the current variation to occupy a previous or next number position in the sequence of variations.

The new button 906 may allow a new variation to be created. The duplicate button 907 creates a copy of the current variation.

The user photo checkbox 908 allows a theme designer to determine whether one of the user's photos can automatically be inserted into the page background when creating a product with this theme. A "placeholder" for the user photo may be loaded using a standard file menu (not shown), and will appear in the background for reference by the theme designer when this box is checked. The user photo may appear behind the other theme variation content. Even if a theme designer elects to leave it unchecked, the user photo checkbox may be activated temporarily to preview what a user photo will look like if they should manually insert one of their photos into the background when creating a product with this theme.

The color box 909 shows the page background color control, expressed as a standard 24-bit 6-digit hexadecimal value. This control may allow a theme designer to set a background color to become visible if an end-user photo is not present or if the user photo is set to be semitransparent using the background alpha control 911.

The user photo brightness control 910 may allow a theme designer to determine whether a user photo will be brightened or darkened if placed in the page background.

The user photo alpha control 911 may allow a theme designer to cause a user photo to be transparent, partially revealing the page background color 909.

The user photo tint control 912 may be expressed as a 24-bit 6-digit hexadecimal value to modify the color appearance of a user photo in the background.

The user photo blur control 913 may allow a theme designer to apply a blurring effect to a user photograph if placed in the background by the user.

The controls 909 through 912 may be combined to create a wide variety of artistic effects. These artistic effects may be designed in advance and stored in a theme. A professionally designed product appearance may later be achieved with a user photograph without manual editing.

Figure 10:
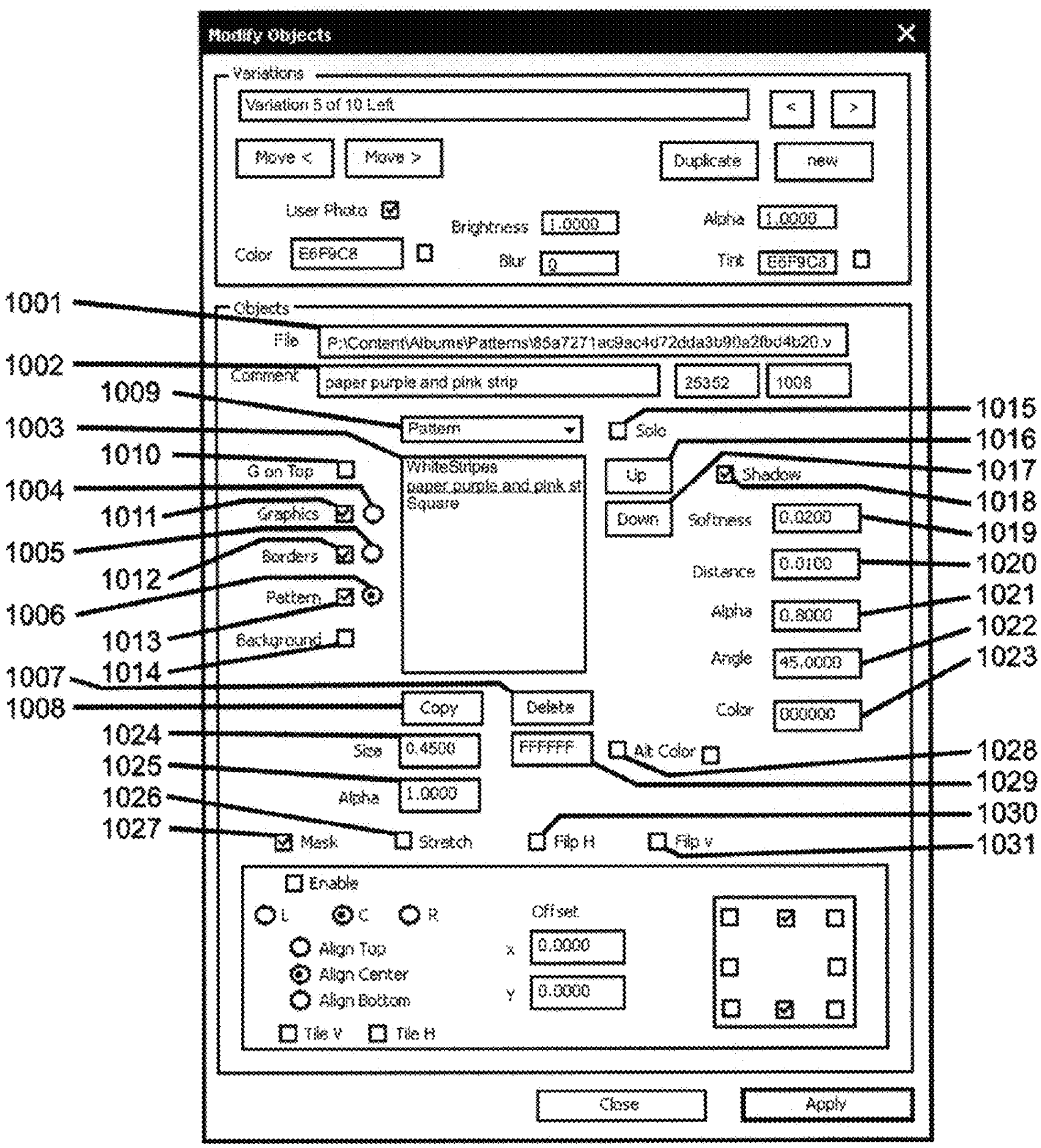

FIG. 10 shows an exemplary object and layer control group.

The layer file indicator 1001 shows the output file containing the currently active layer. The output file may contain one or more graphical objects, each with its own alpha transparency data, and may also contain all of the various rendering parameters applied by a theme designer to each object in that layer using other controls.

The comment box 1002 allows a theme designer to rename the object selected in the object & layer arrangement box 1003. The object & layer arrangement box 1003 allows a theme designer to select individual objects within a layer for editing, and for depth arrangement using the object depth buttons 1016 and 1017.

Layers may be used to group objects into one of three primary layers. The graphics, borders, and patterns layers are named for how each may be used. The graphics layer may be on top, for primary graphical elements that should be on top of the rest of the theme content (or even on top of any end-user photographs placed on the foreground). The borders layer may be in the middle, for graphical elements used as outlines or borders, usually placed on one or more sides or around the perimeter of the page. The patterns layer may be on the bottom, just above the page background color or the user's photo if one is present, for textures, patterns or lighting effect gradients that may be applied across the entire surface of the page. Any arrangement of the various layers may be possible. Fewer or more layers may be provided and still fall within the scope of various embodiments.

Within each of these layers, one or more graphical objects may be dragged and dropped from a file requestor onto the preview workspace. An object placed in a layer, may then be depth-arranged within that layer using the depth (up and down) buttons 1016 and 1017, or may be moved to a different layer using the object-layer relocation dropdown 1009.

The layer selection radio buttons 1004 through 1006 allow selection of a layer for editing. When a given layer is selected, the properties of the objects within it may be adjusted with the object rendering controls 1020 through 1037 and the alignment and tiling controls described in FIG. 11.

The layer relocation dropdown 1009 initially displays the name of the layer within which the currently selected object resides. Clicking on this drop-down menu may bring up a list of the other available layers, permitting selection of a different layer to which the currently selected object may then be moved.

The graphics on top checkbox 1010 may allow a graphics layer to be rendered on top of the user photo when a product is created using this theme. The graphics on top checkbox 1010 may be useful for making a primary graphic design element more prominent, such as a flower or product logo placed in the corner of the page, which might otherwise be obscured by a user photograph.

The layer visibility selection checkboxes 1011 through 1014 may allow one or more of the three primary layers to be hidden to aid work with objects in another layer. The background 1014 allows the page background color or user background photo if present to be hidden, instead displaying a gray-on-gray checkerboard which provides a more easily visible indication of object transparency in the three primary layers.

The solo checkbox 1015 may allow isolation of the current object for easier editing. When this is selected, all other objects in the current layer may be hidden from view.

The controls 1011 through 1015 may be used while working on specific layers or objects. These controls do not affect the rendering of the theme when used to create a product.

The shadow enable checkbox 1018 may allow the values in controls 1019 through 1023 to be used to control the shadow properties, which may use the current layer transparency to create a shadow that will be applied on top of the layers below. A larger value may be used to set the shadow softness 1019 to make a softer-edge shadow, while a larger value may be used to sets the shadow distance 1020 to offsets the shadow farther away.

The shadow alpha 1021 controls the shadow transparency between 1 (opaque) and 0 (transparent). The shadow angle 1022 influences the direction of the offset from 0 to 360 degrees, 0 being to the right.

The shadow color 1023 may be expressed as a standard 24-bit 6-digit hexadecimal value. This may default to 000000 (black) to create a dark shadow, but other colors may be used to create a colored shadow or glow effect.

The size 1024 of the currently selected object may be expressed as a percentage of the overall width or height of the theme workspace, whichever is smaller. For example, a value of 1.000 would occupy the full width or height. A value of 0.500 would occupy one-half (½) the width or height. A value above 1 may be entered, such as 1.500 which may occupy one and a half (1½) the width or height, i.e. the current object may appear to "bleed" off the edge of the narrowest dimension of the page.

The object alpha 1025 controls the transparency of the selected object between 1 (opaque) and 0 (transparent).

The stretch 1026 causes the current object to stretch to fill the entire working area, matching the final output aspect ratio of the product created with this theme. The stretch 1026 may be used to cause a graphic to fill the working area, or may be used to apply a lighting gradient effect across the entire page.

The mask 1027 may cause the current object to be rendered where other objects on that layer appear below the current object. The mask 1027 may be used to apply a repeating texture across one or more objects on that layer, or to apply a lighting gradient across objects on that layer without affecting any other layers. In combination with the stretch 1026, and the depth (up and down) controls 1016 and 1017, the mask 1027 may be used to apply a texture or lighting effect across all objects on the current layer, or across only selected objects below.

The alternate color 1028 may replace the original graphic content with the solid color value entered into controls 1026-1029. The alternate color 1028 may be expressed in standard 24-bit 6-digit hexadecimal format. In combination with the mask 1027, other graphic elements on the layer may apply additional textures or gradients to the solid color on this object.

The flip H 1036 may cause the selected object to be flipped horizontally, while the flip V 1037 may flip the selected object vertically. The flip H 1036 or flip V 1037 may be useful for creating repeating motifs that may automatically align to a final aspect ratio by copying and flipping a single object and using alignment controls.

Figure 11:
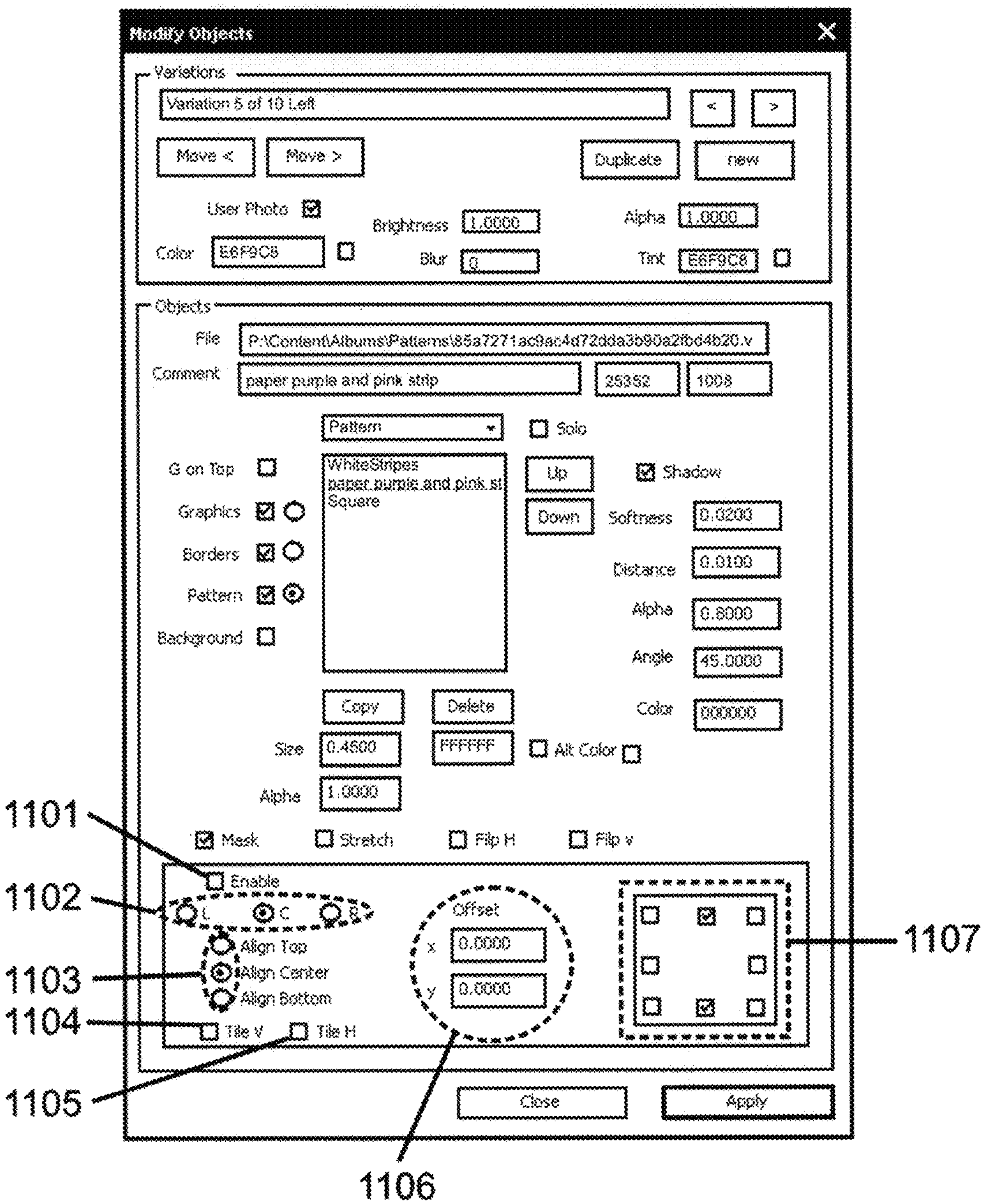

FIG. 11 shows exemplary alignment and tiling controls, a subgroup of the object and layer control group. These controls may act on the object currently selected in the object & layer arrangement box 1103, allowing it to be positioned by vertical and horizontal alignment, tiling or repetition along an edge of the workspace, or a combination thereof.

The alignment & tiling enable checkbox 1101 may allow the current object to become visible, and its position may be controlled by the alignment controls 1102 and 1103. The tiling controls 1104 and 1105 may be used to control the repetition of the current object.

The horizontal alignment control radio buttons 1102 may be used to align the current object to the left edge (L), center (C), or right edge (R) of the workspace.

The vertical alignment control radio buttons 1103 may be used to align the current object to the top, align center, or bottom.

The tile vertical checkbox 1104 may be used to repeat the current object from the top of the workspace to the bottom.

The tile horizontal checkbox 1105 may be used to repeat the current object from the left of the workspace to the right.

The offset controls 1106 may be used to offset the object relative to the position determined by the alignment controls 1102 and 1103. These controls may be used to either move an object away from the center, move it inward from the chosen alignment edge, or move it outward from the chosen edge. The controls may set to a negative value, causing the object to "bleed" partially off the edge of the page. As with the size control 1024, these offset values may be expressed as a percentage of the object size as calculated in steps 440 and 450 of FIG. 4, allowing the offsets to automatically conform to the aspect ratio of the final product created with this theme while maintaining the relative position of the image on the page.

The offset controls 1106, the alignment controls 1103 and the tiling controls 1104 & 1105 may be used to place one or more copies of an object relative to the center, an edge or a corner of the workspace. The object may remain in that relative position regardless of the aspect ratio of the final product created with this theme by the user, as shown by the tiled "Rippled Ribbon" graphic, discussed herein.

The edge repetition controls 1007 may be used to create one or more copies of the current object. The copy or copies may be aligned along any edge or corner of the workspace. In combination with the size control 1024 and the offset controls 1106, individual graphic objects or bands of objects may be positioned along or near any edge of the page, and they may automatically scale to fit the aspect ratio of the final product created with this theme by the user. With different graphical content, a nearly infinite variety of border and edge effects may be created.

FIG. 12-30 show exemplary embodiments for rendering one or more graphic elements on a page while independently maintaining the aspect ratio of each the graphic elements as intended by a theme designer.

Figure 12:
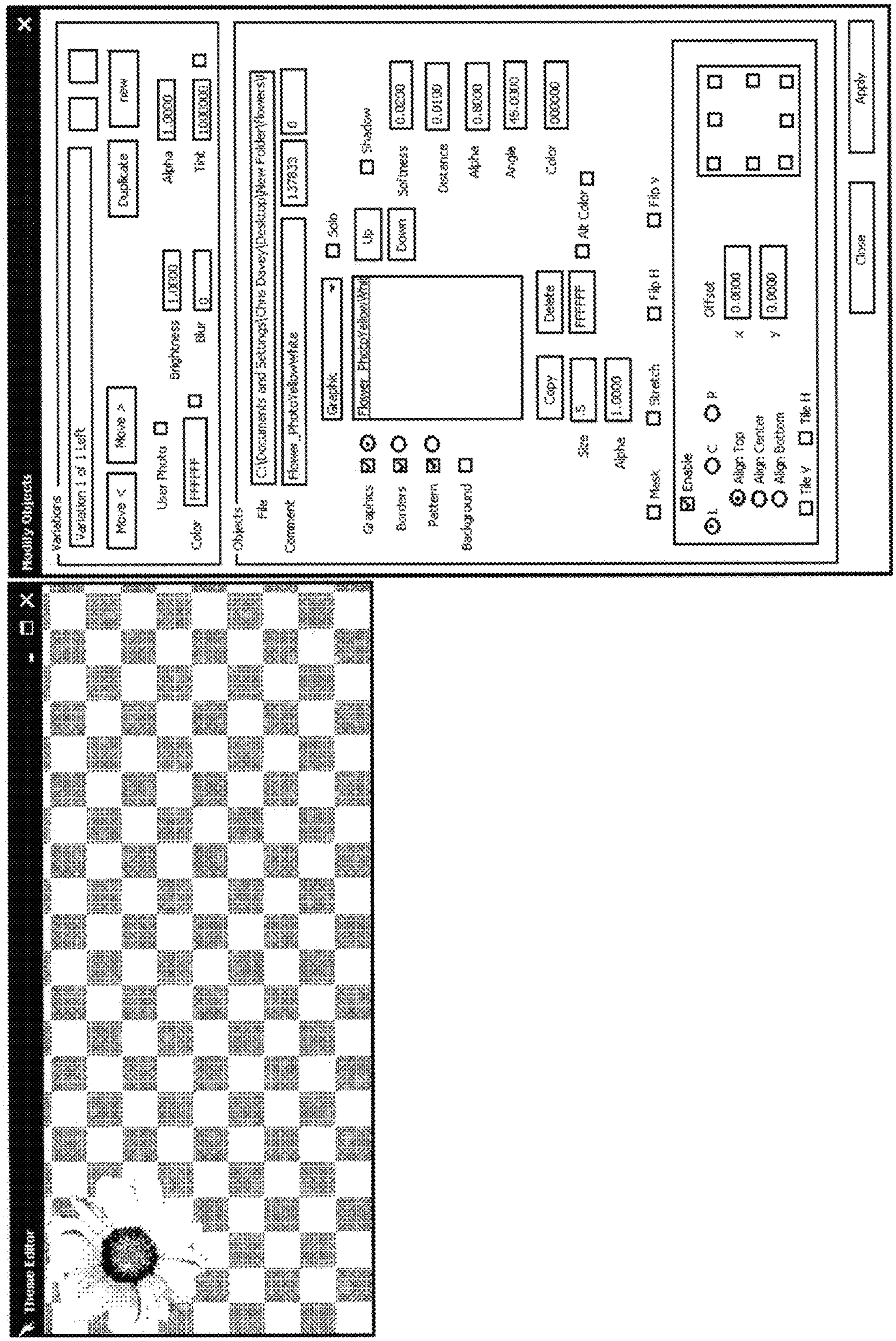
FIGS. 12-36 are screen shots of an exemplary workspace showing examples of graphic elements rendered on a page while maintaining the aspect ratio and resolution of an image on a printed product independent of the background.

FIG. 12 shows the same settings as shown in FIG. 7 with the preview workspace changed to be shorter and wider than the workspace in FIG. 7. In this case, the flower image occupies one-half (½) of the total height, whereas in FIG. 7 it occupied one-half (½) of the total width.

Figure 13:
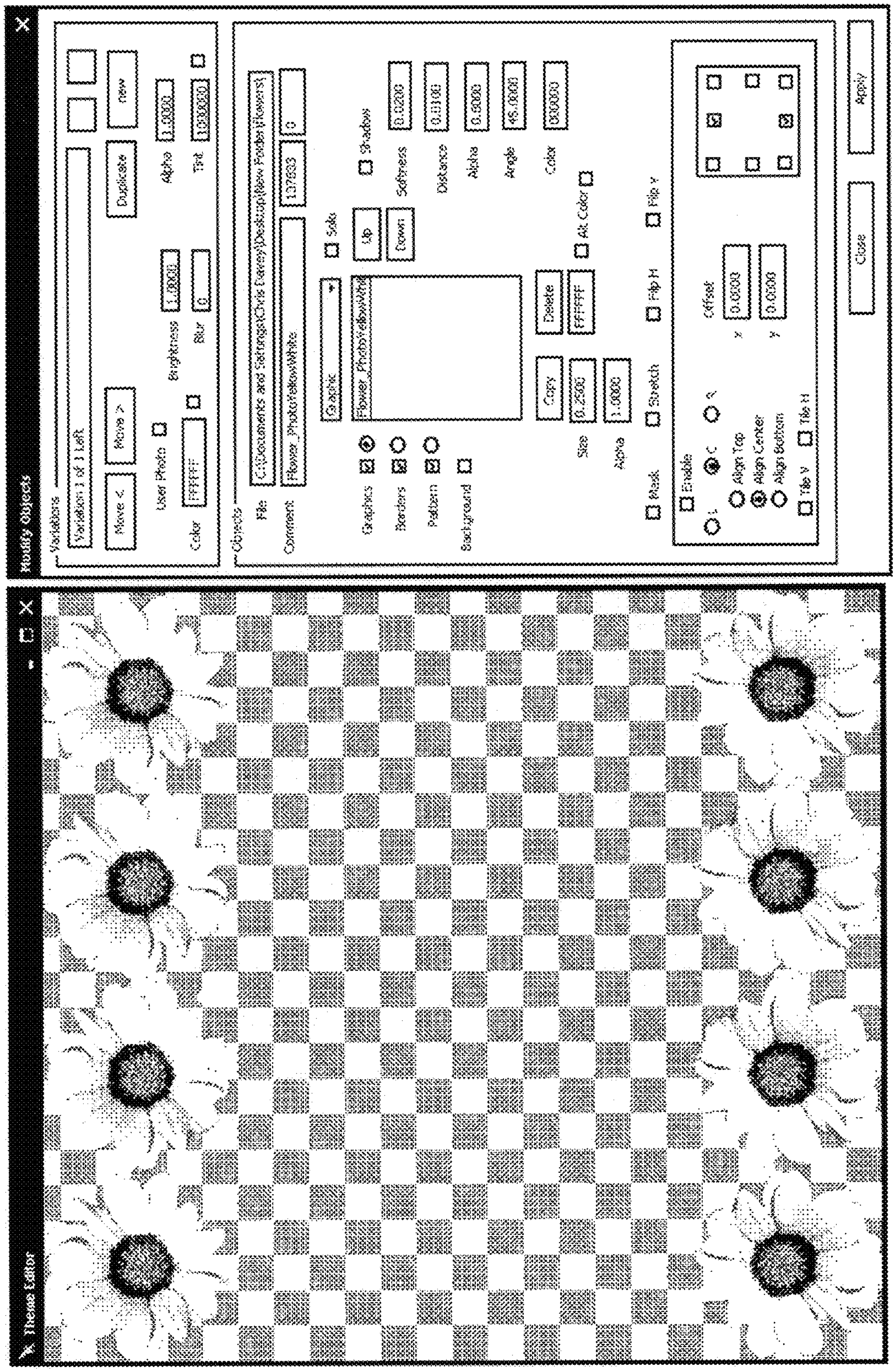

FIG. 13 shows the graphic element flower of FIG. 12. The preview workspace has been dragged into a square aspect ratio. The size of the flower object has been reduced from 0.5 in FIG. 12 to 0.25 and the top center and bottom center options in the repeat box are checked. The combination of the square preview workspace and flower size of 0.25 results in four flowers (i.e., each one-quarter in size of the smaller of the width or length) across the top and bottom.

Figure 14:
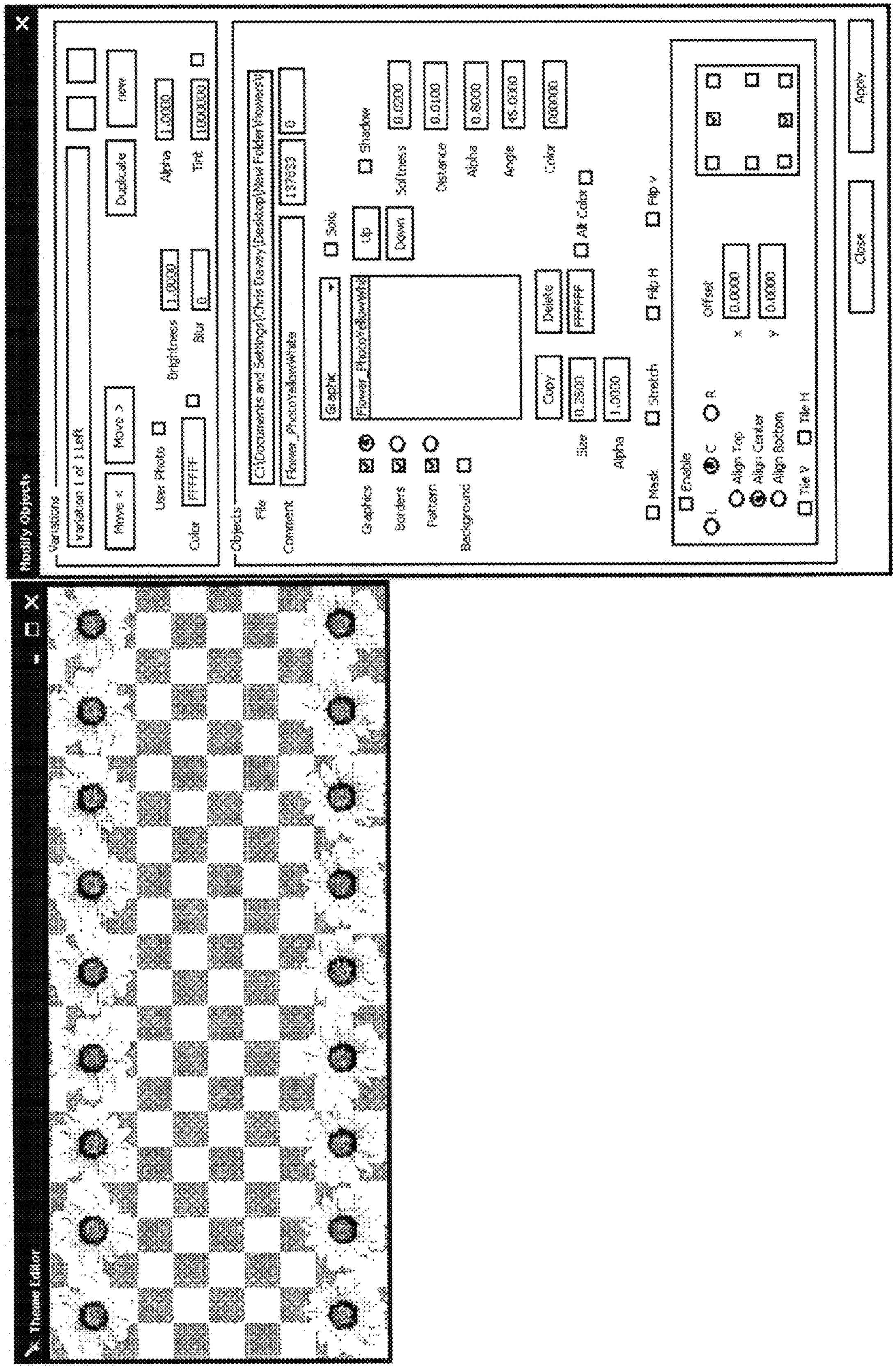

FIG. 14 differs from FIG. 13 in that the preview workplace has been reduced to a much smaller height. This has caused the flower to also reduce in size to one-quarter of the height, but more flowers are now tiled along the top and bottom of the wide aspect workspace. The same principle may apply to repeating vertical bands of objects on the left and right sides, or objects repeating on all four sides.

Figure 15:
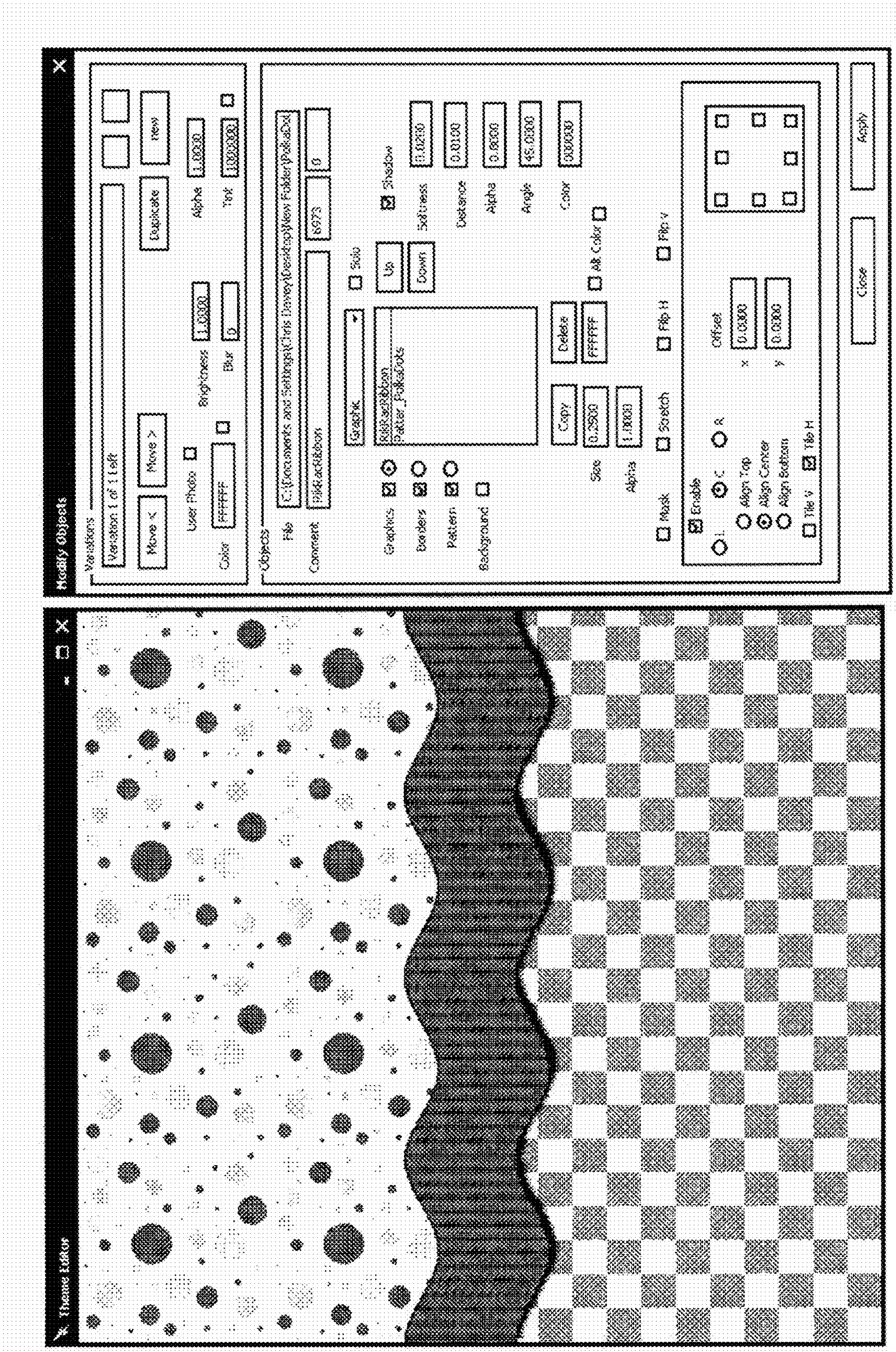

FIG. 15 shows a repeating two-dimensional tile, plus a repeating horizontal band, in a square aspect preview workspace. A tiling polka-dot pattern has been selected, set to a size of 0.25, and set to tile in the top half of the screen. A repeating wavy ribbon has also been loaded, and is currently active. The "Align Center" and "Tile H" options have been selected at the bottom. The "Shadow" option at right has been selected, and parameters have been entered to create a soft drop-shadow below the ribbon.

Figure 16:
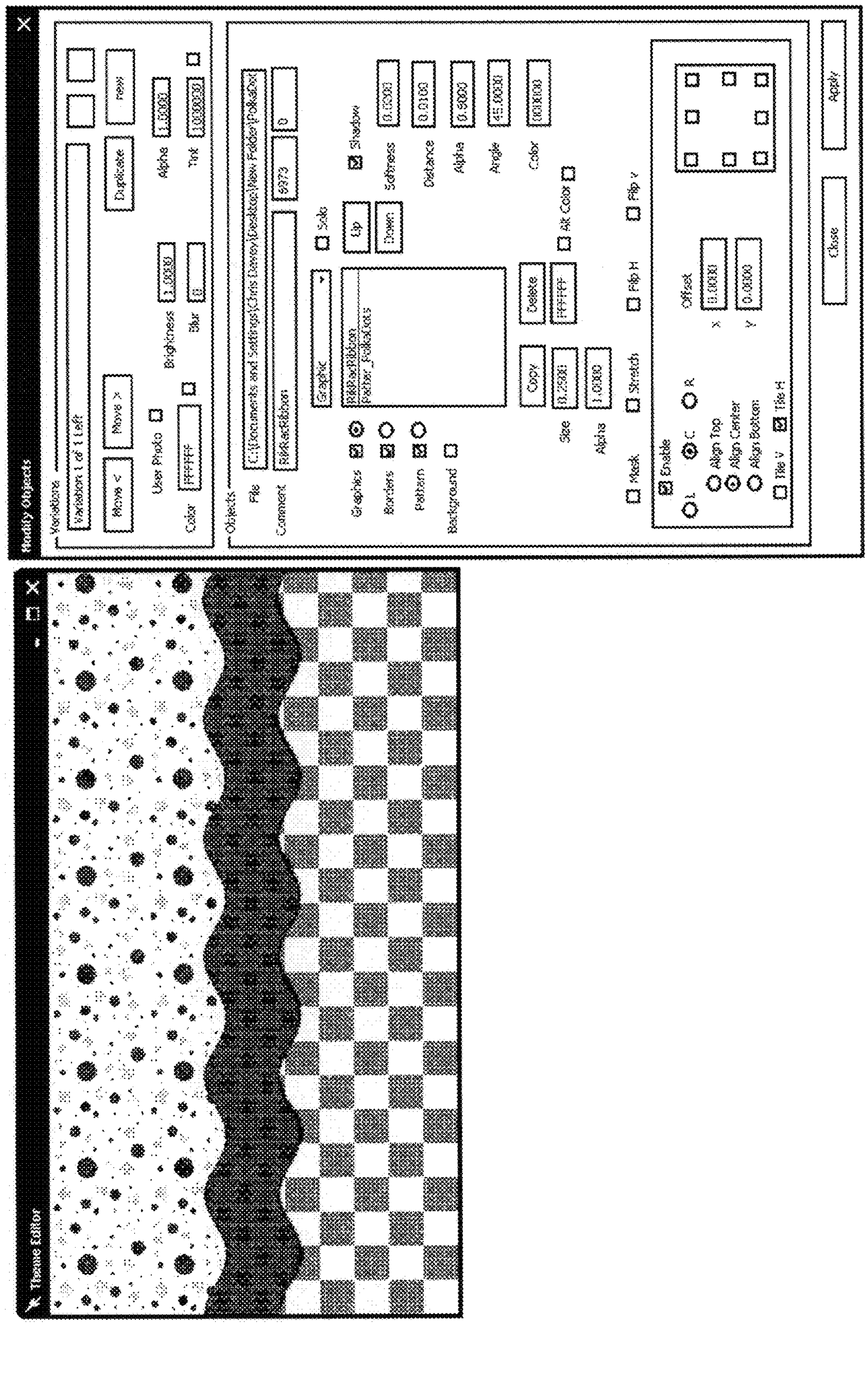

FIG. 16 is similar to FIG. 15, except that the workspace has been dragged to a short and wide aspect ratio. The polka-dot pattern has remained one-quarter (¼) of the overall height, but now repeats additional tiles to the right. The ribbon maintains relative height and repeats additional ripples to the right. The same principle may apply to vertical patterns.

Figure 17:
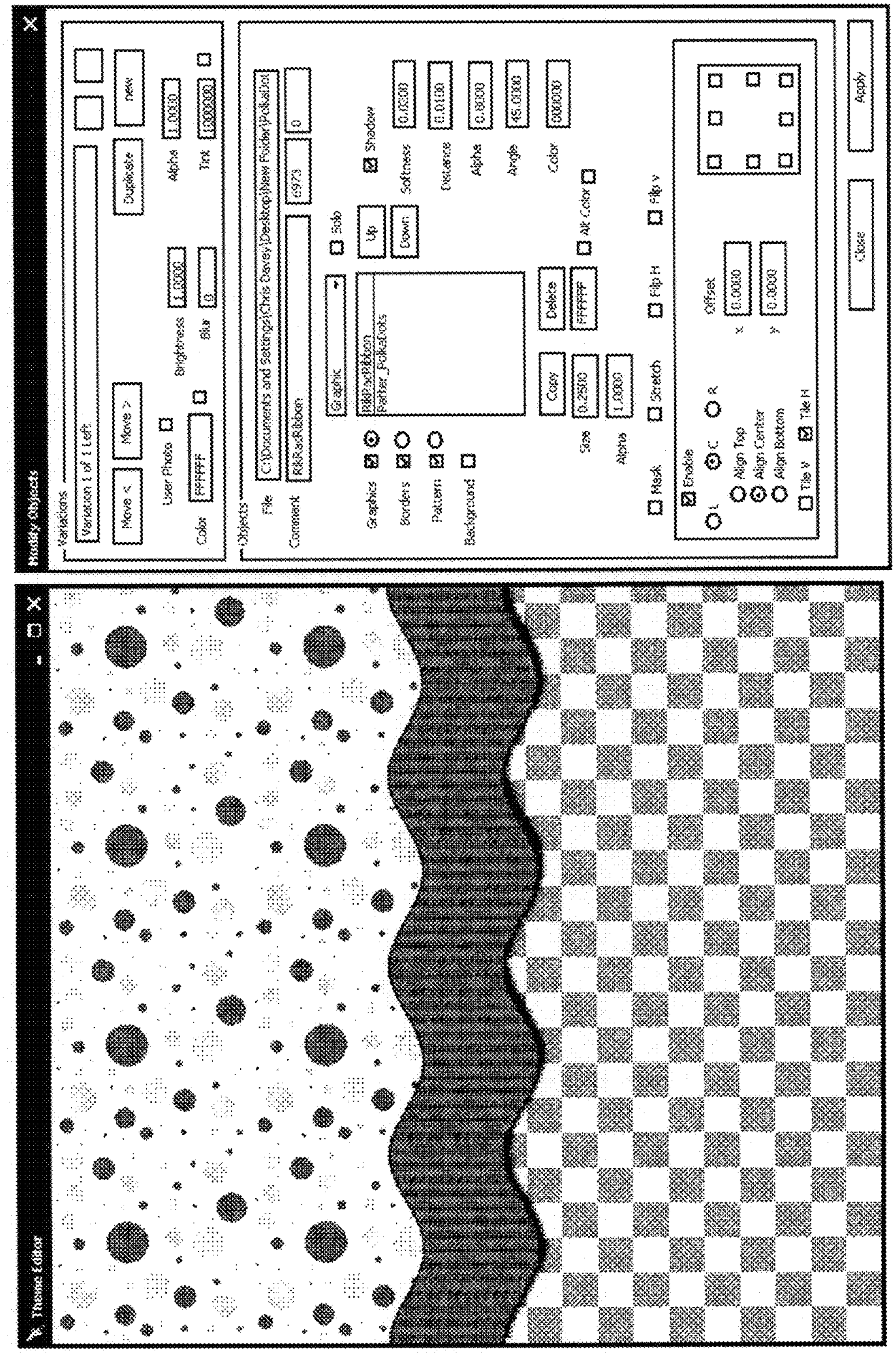

FIG. 17 is similar to FIGS. 15 and 16, except that the workspace has been dragged to a tall aspect ratio. The polka-dot pattern has remained one-quarter (¼) of the overall height, but now repeats fewer tiles to the right because of the change in aspect ratio. The ribbon maintains relative height and similarly repeats fewer ripples to the right.

Figure 18:
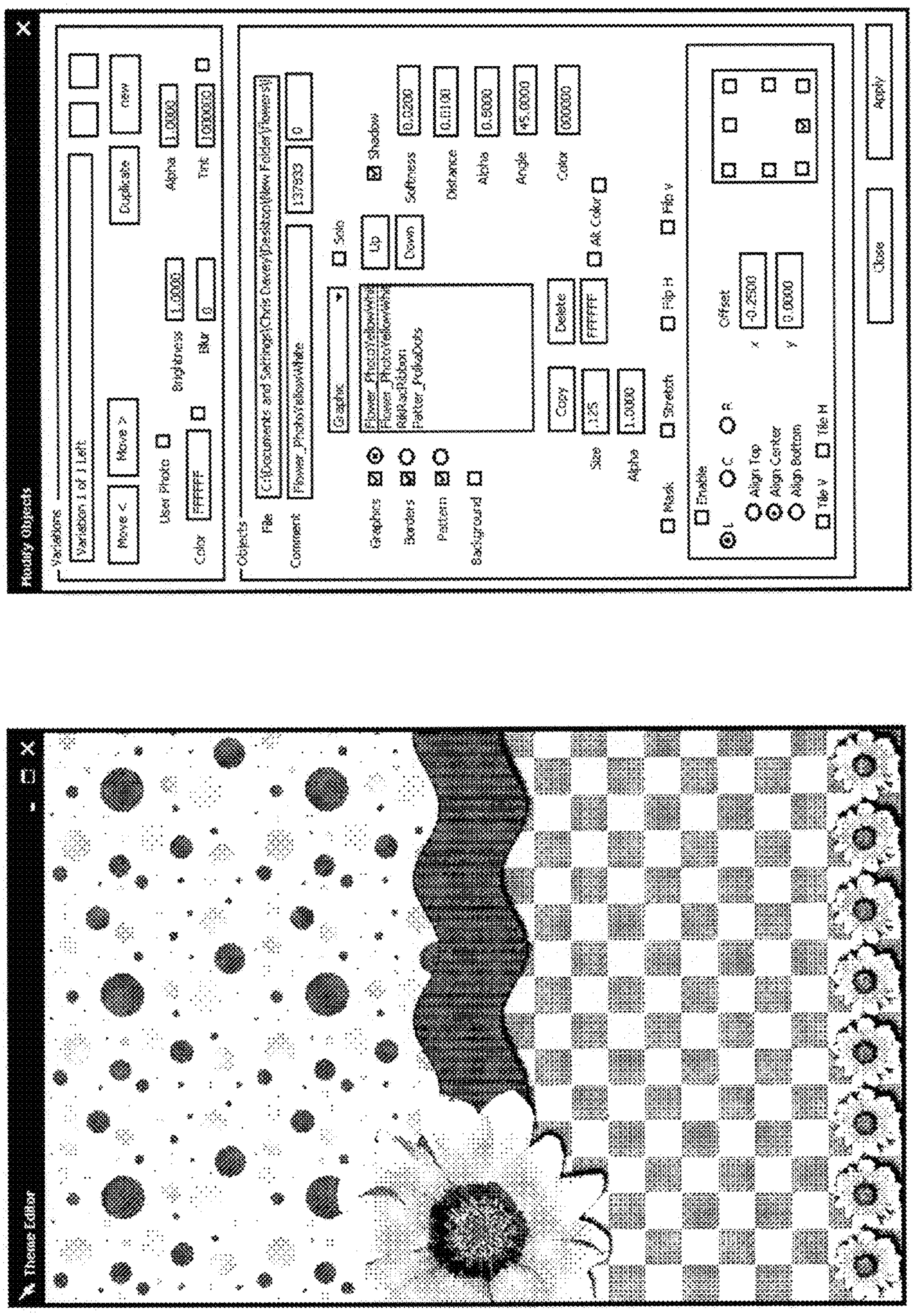

FIG. 18 is similar to FIG. 17 with two flower images as used in FIG. 7. One flower is centered vertically, left aligned, shadowed and a negative value of −0.25 has been used to offset it further to the left to be partially off the page. An additional copy of the flower has been set to align to the bottom, with horizontal tiling. The size is set to 0.125 (or ⅛), which creates a set of 8 repetitions on a tall aspect workspace, as shown.

Figure 19:
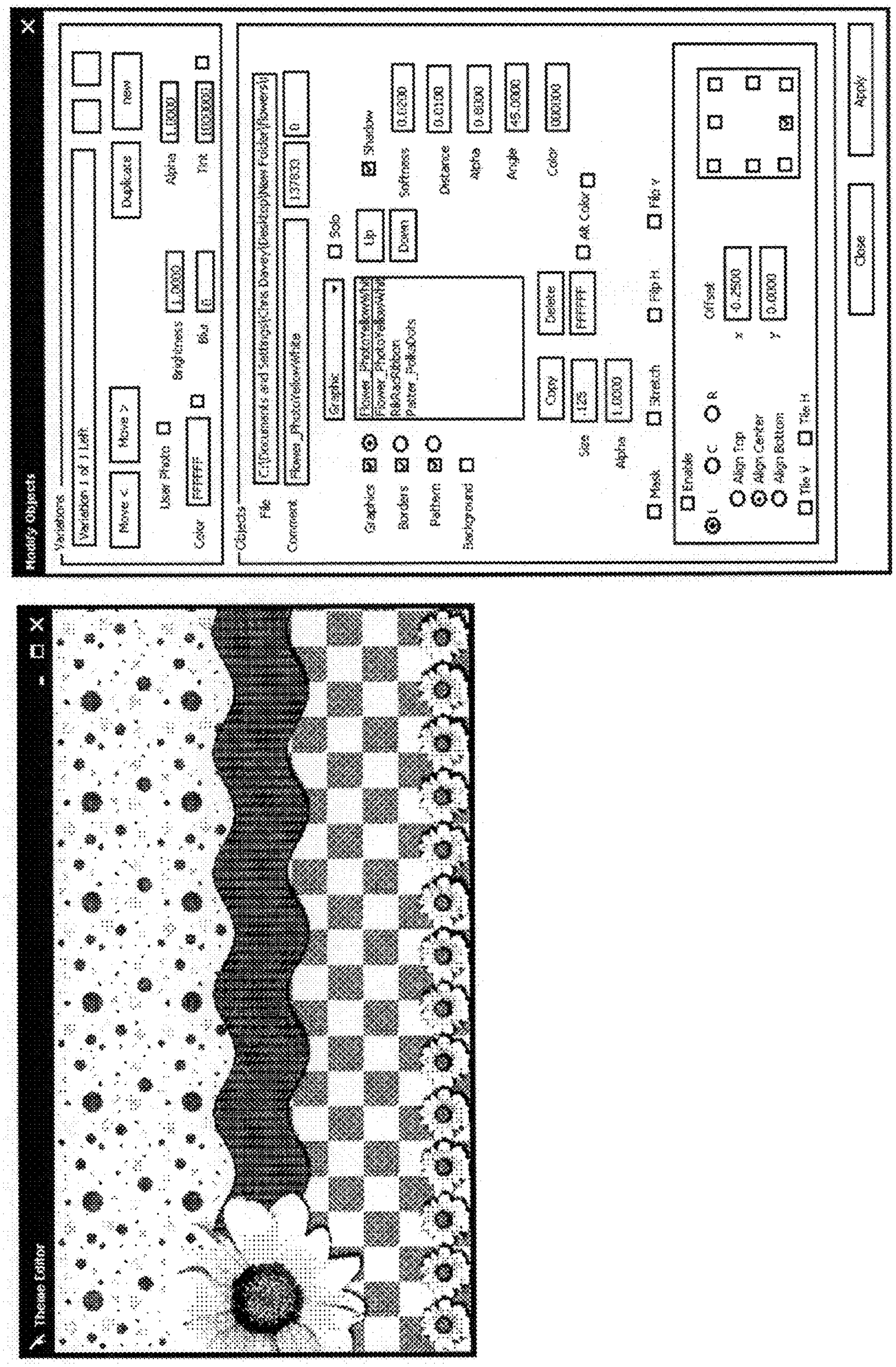

FIG. 19 is similar to FIG. 18, except that the workspace has been dragged to a wide aspect ratio. The flower at left and the flowers at the bottom have maintained their relative size to the workspace. The reduction in height has increased the number of ribbons repeating to the right, and the number of flowers in the repeating band of flowers at the bottom.

Figure 20:
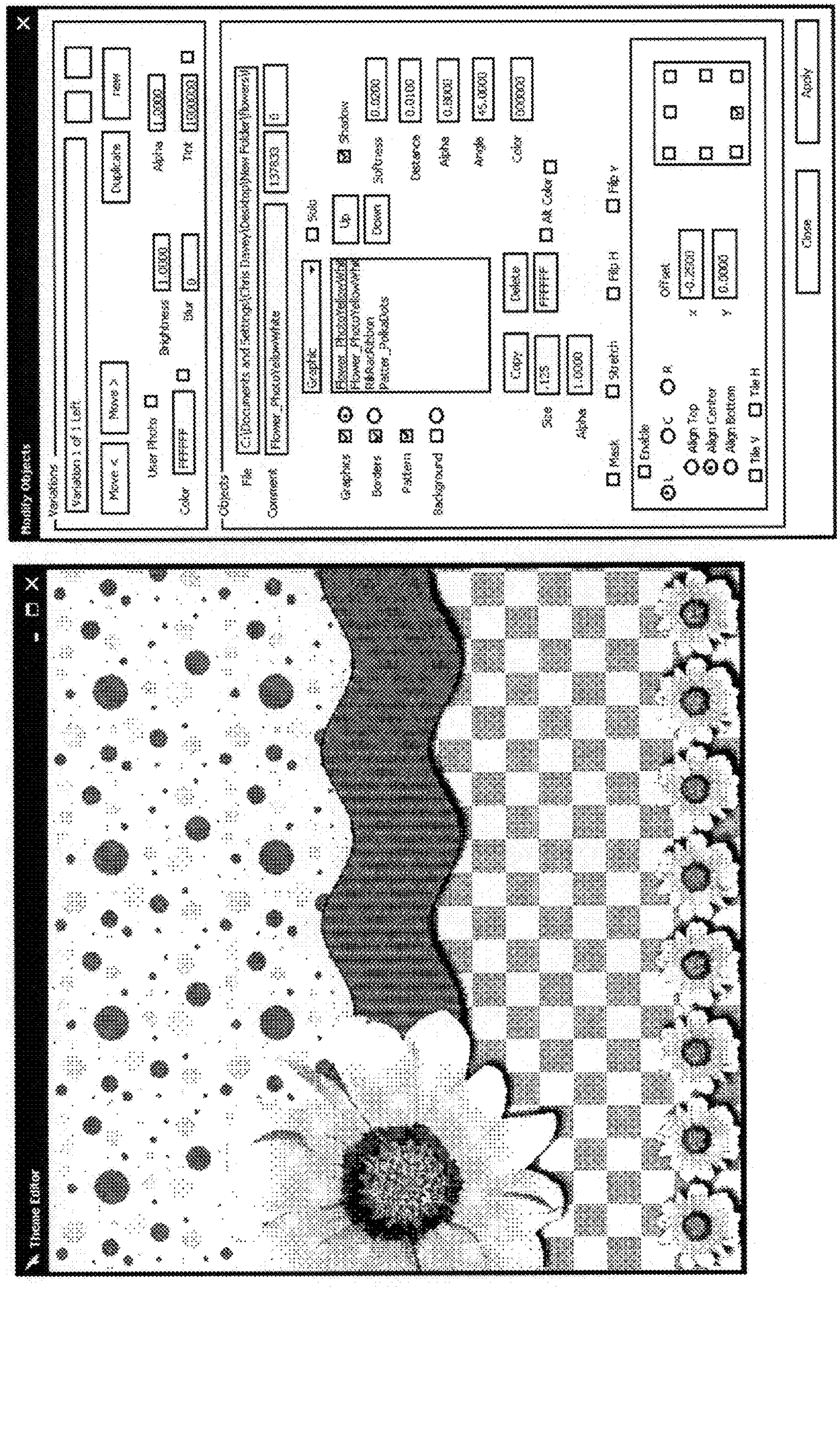

FIG. 20 is similar to FIGS. 16 and 17, except that the workspace has been dragged to a square aspect ratio. The increase in height has increased the size of the flower at left, which has maintained is relative size to the ribbon, but the ribbon has fewer repetitions to the right. The repeating band of flowers at the bottom has maintained their relative height, while also repeating fewer repetitions to the right.

Figure 21:
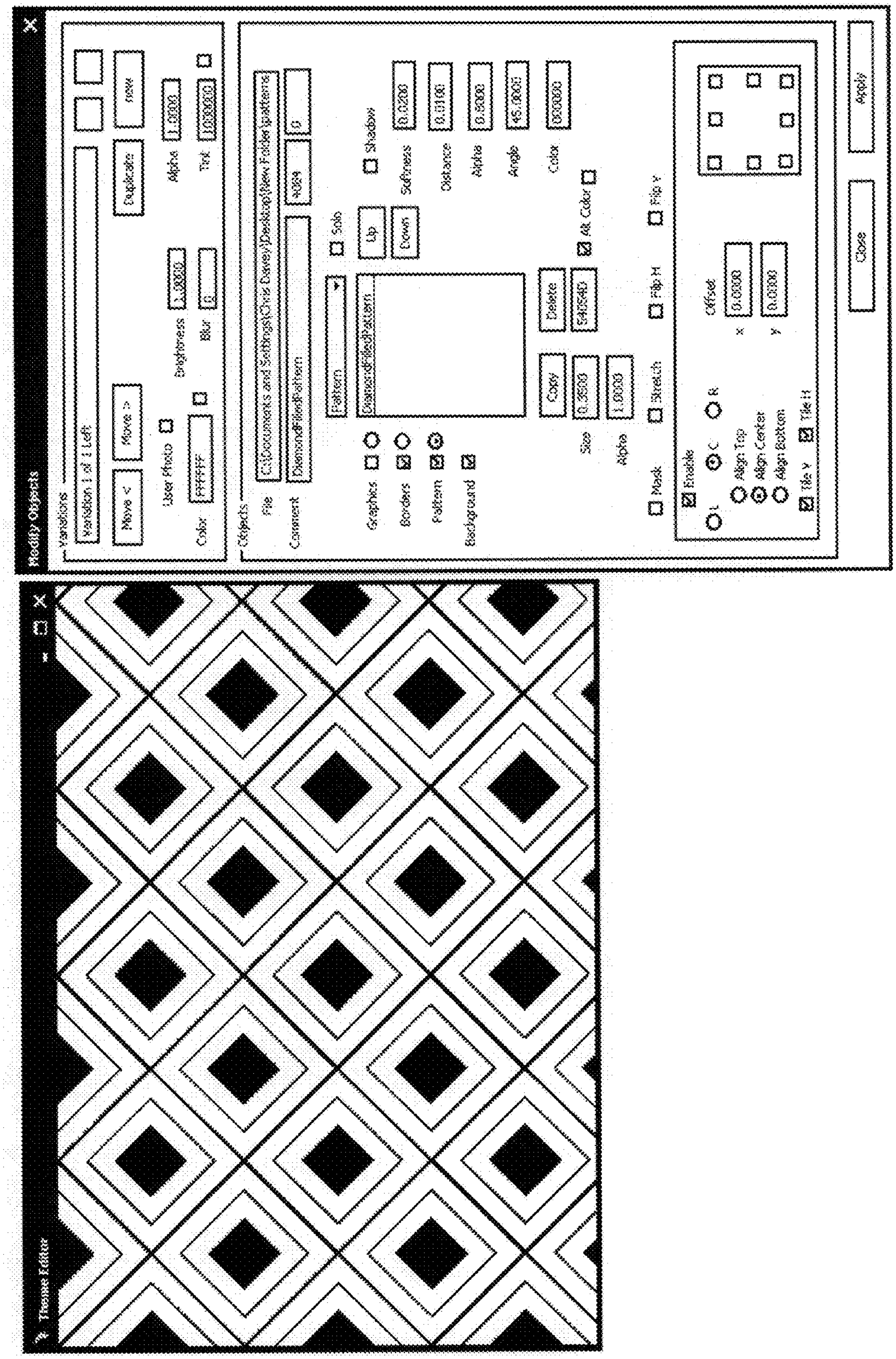

FIG. 21 shows a diamond vector graphic pattern in a wide aspect workspace. The "Tile V" and "Tile H" options at bottom are both selected, tiling the diamond vector graphic pattern both vertically and horizontally. A solid white background has been activated. The "Alt Color" box is checked, with a color value entered into the adjoining box to apply a different color to the selected object.

Figure 22:
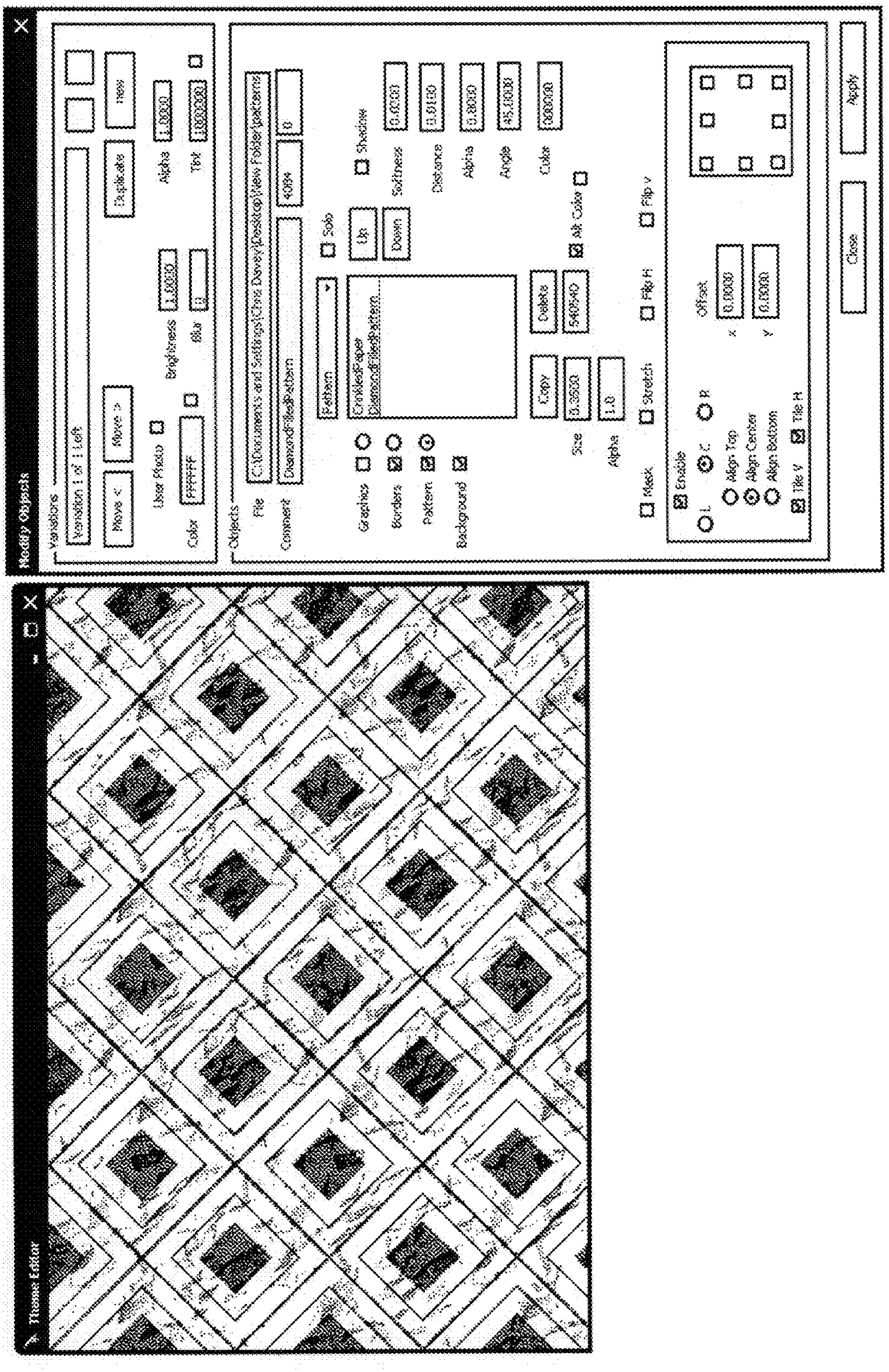

FIG. 22 is similar to FIG. 21, except that a crinkled paper has been set to be a transparent overlay on top of the diamond pattern.

Figure 23:
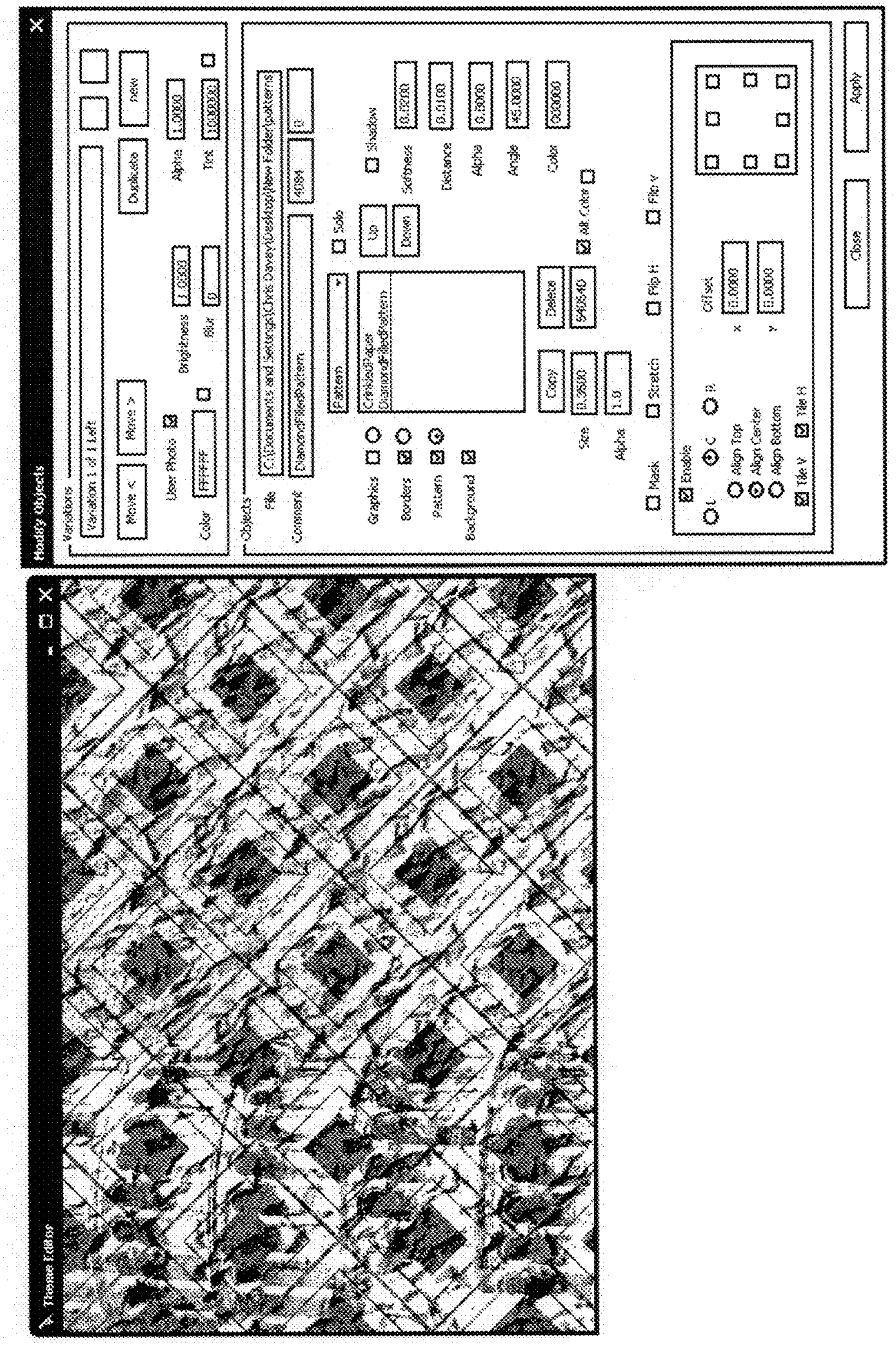

FIG. 23 is similar to FIG. 22, except that a "User Photo" is in background. The photo does not necessarily become part of the resulting theme, but may be used as a reference for a theme designer to preview what a user might see, according to some embodiments. The diamond pattern has transparent sections as part of the vector artwork, while the crinkled paper has an overall transparency set. Together the diamond pattern and the crinkled paper may create a texture to be applied on top of the user's background photo when the user creates a product with this theme.

Figure 24:
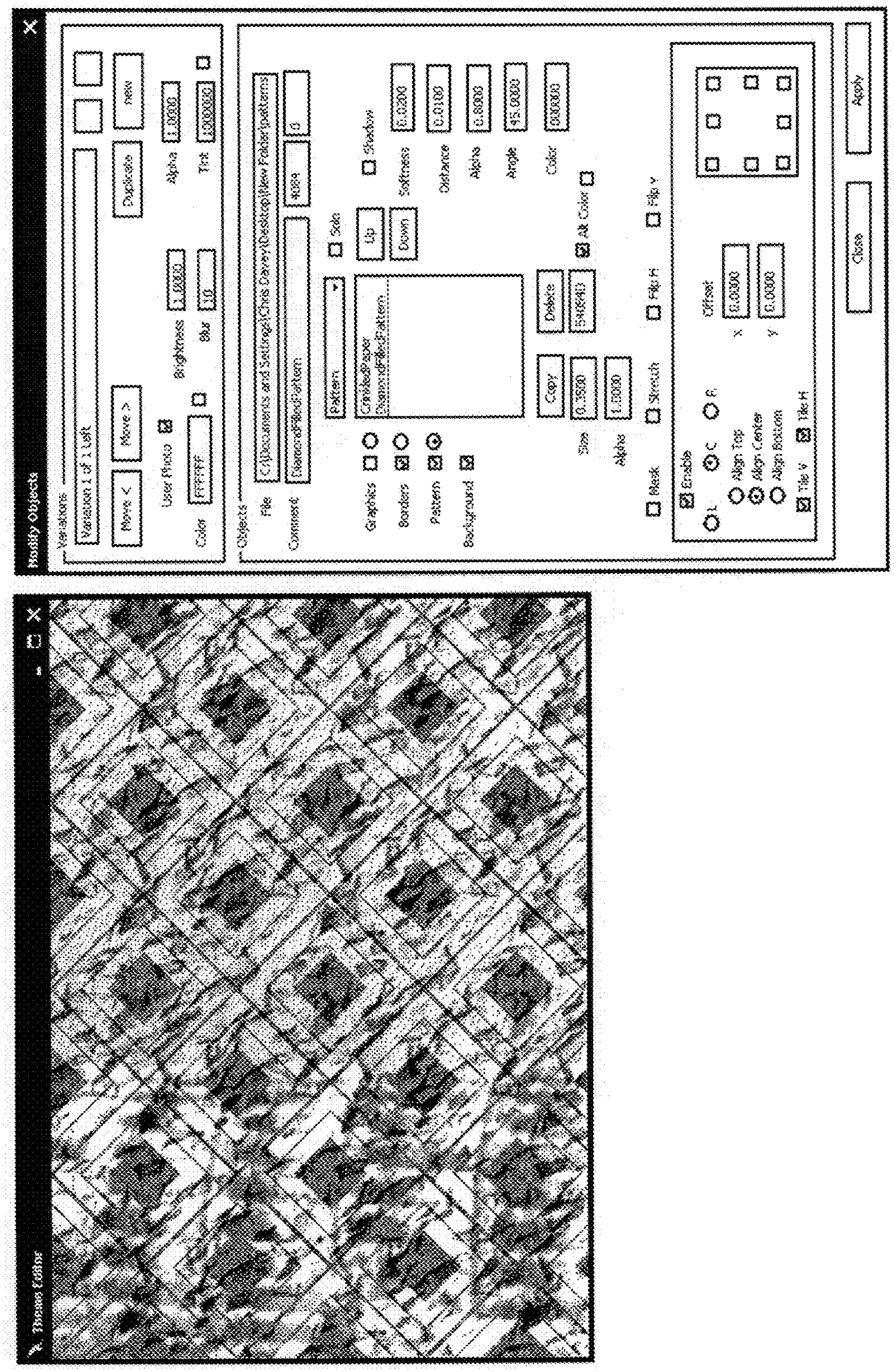

FIG. 24 is similar to FIG. 23, except that a blur effect has been added to the background photo. As with the brightness, alpha and tint parameters at the top, the blur parameter may be stored as part of the theme and applied to any user photograph loaded while creating an actual product using this theme.

Figure 25:
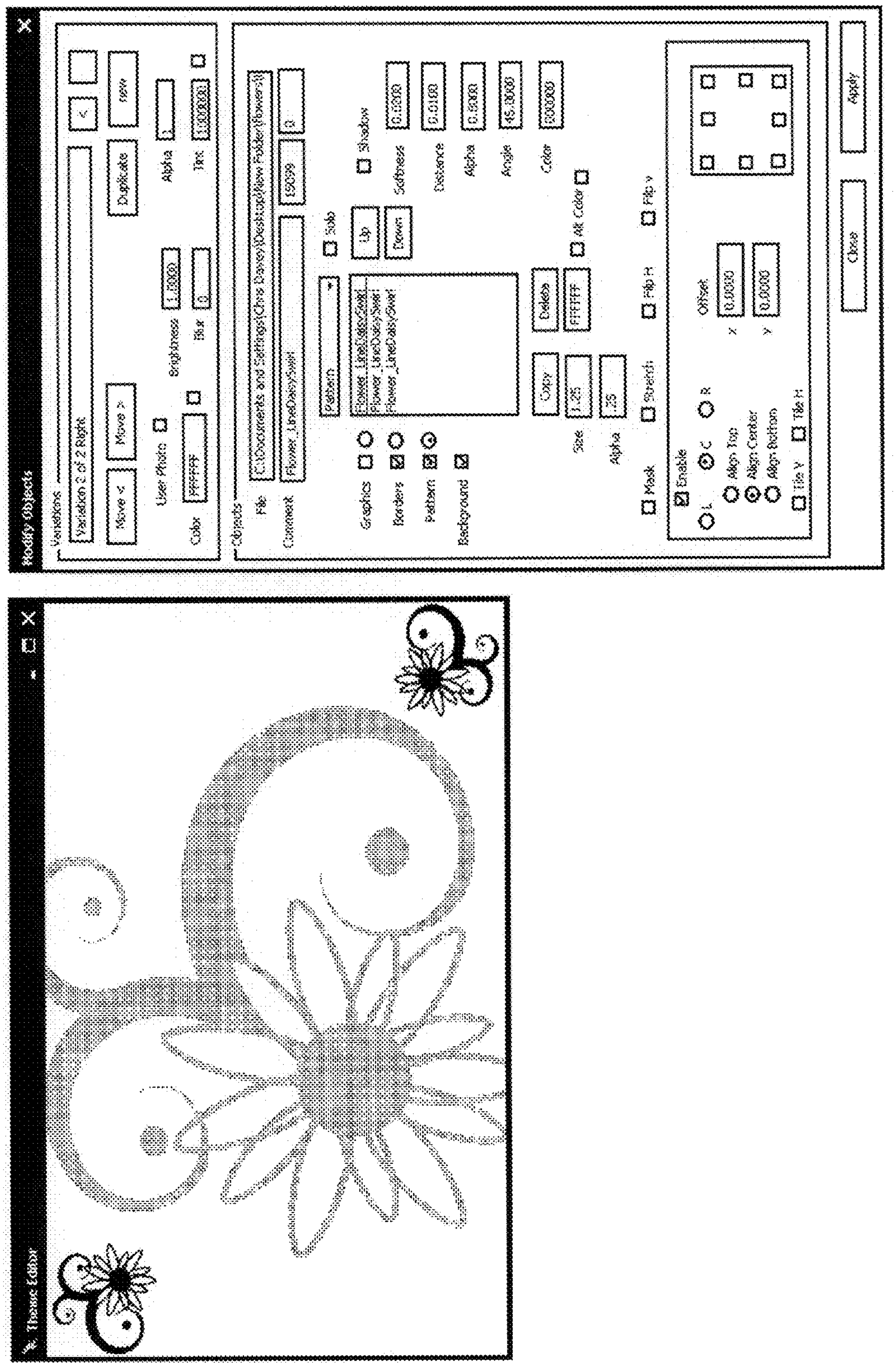

FIG. 25 shows a single vector-based curlicue graphic copied in triplicate using the "Copy" button. Note that this does not actually duplicate the graphic element data itself, but rather creates additional references to that data, which are then available as "virtual copies" in the preview and object list. Two of these copies have been scaled to a size of 0.25 (¼), aligned into the corners, and rotated or flipped to orient to the center. A third copy has been set to a size of 1.25 (125%) causing it to bleed partially off the edges of the page, with an alpha transparency of 0.25.

Figure 26:
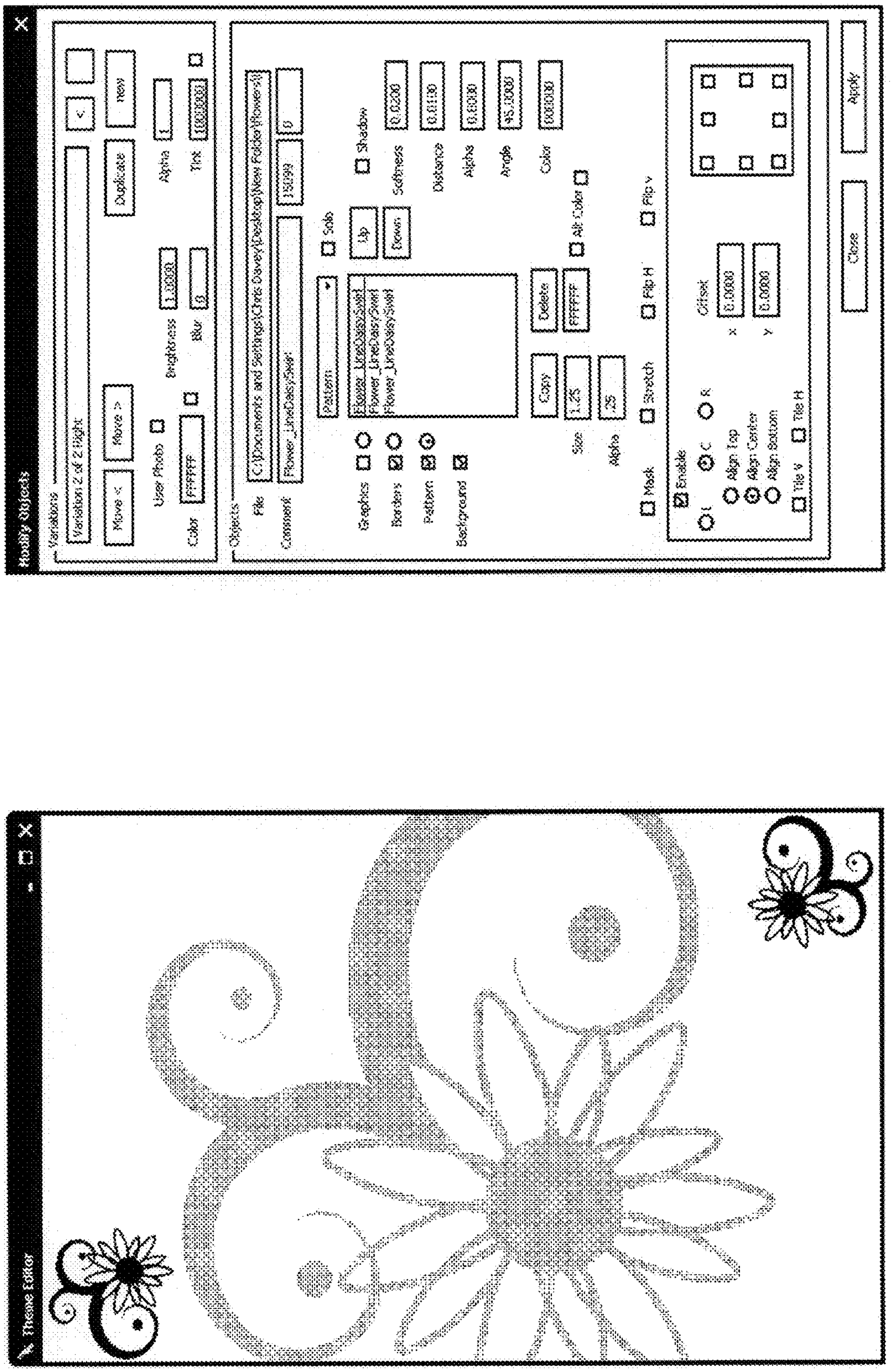
Figure 27:
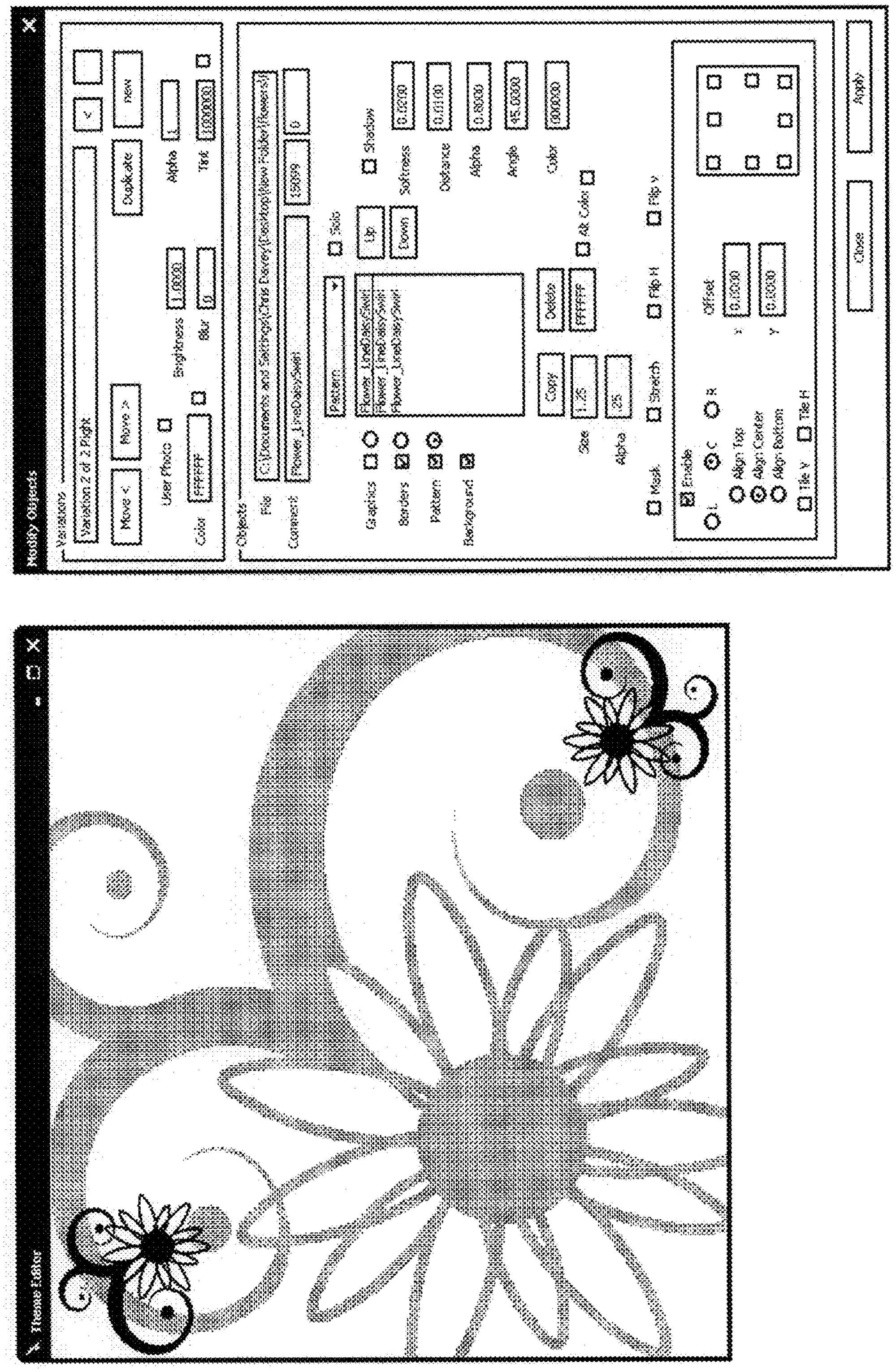

FIG. 26 is similar to FIG. 25, except that the workspace has been dragged to a tall aspect ratio. The small curlicue elements stay aligned in their respective corners. The large element maintains its relative size of 1.25 and continues to bleed slightly off the edge of the page FIG. 27 is similar to FIGS. 25 and 26, except that the workspace has been dragged so that the page is only slightly shorter than it is wide. The large curlicue element now bleeds slightly off the top and bottom edges by the same ratio as in FIG. 25.

Figure 28:
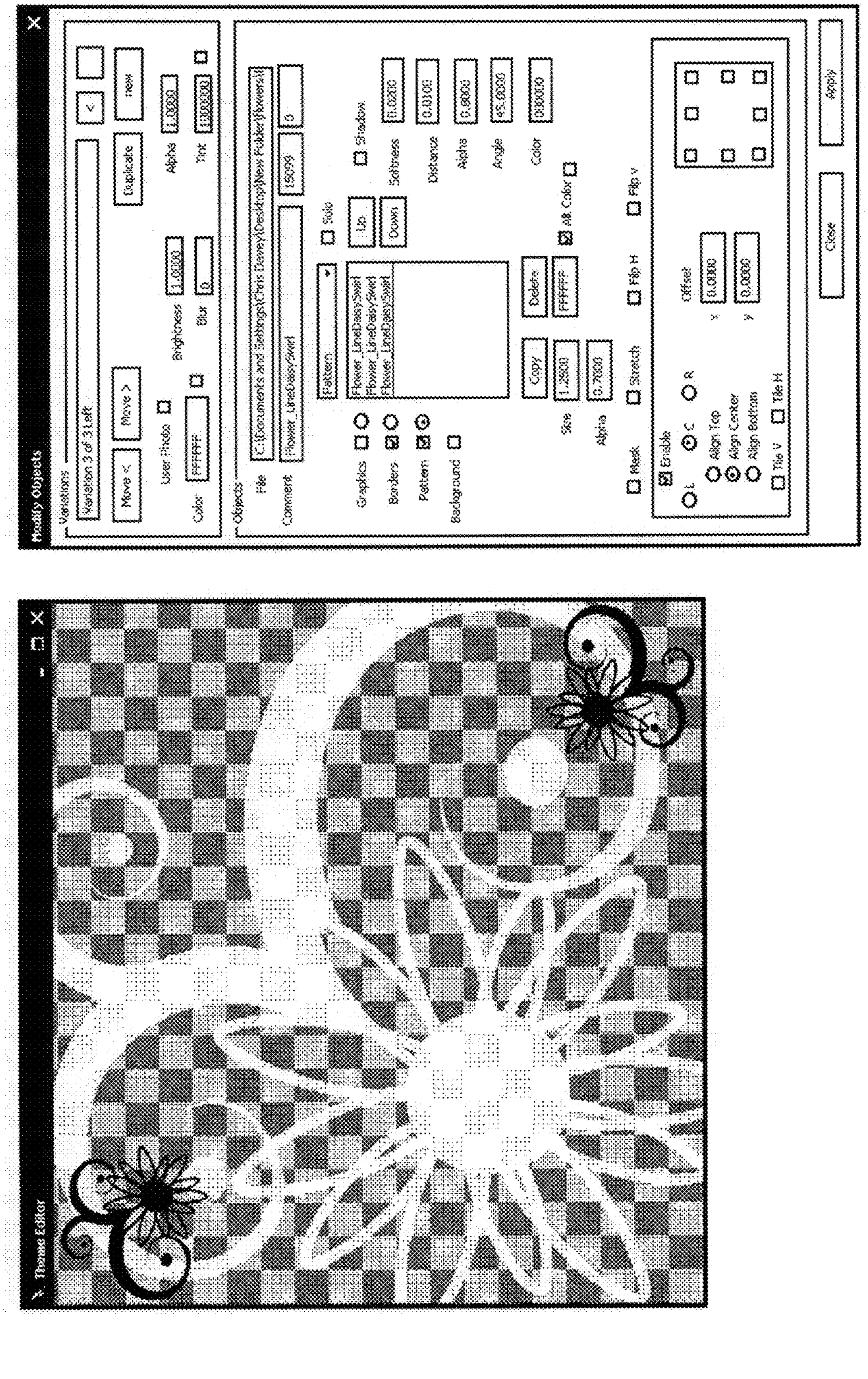

FIG. 28 is similar to FIG. 27, except that the "Background" color option has been turned off.

Figure 29:
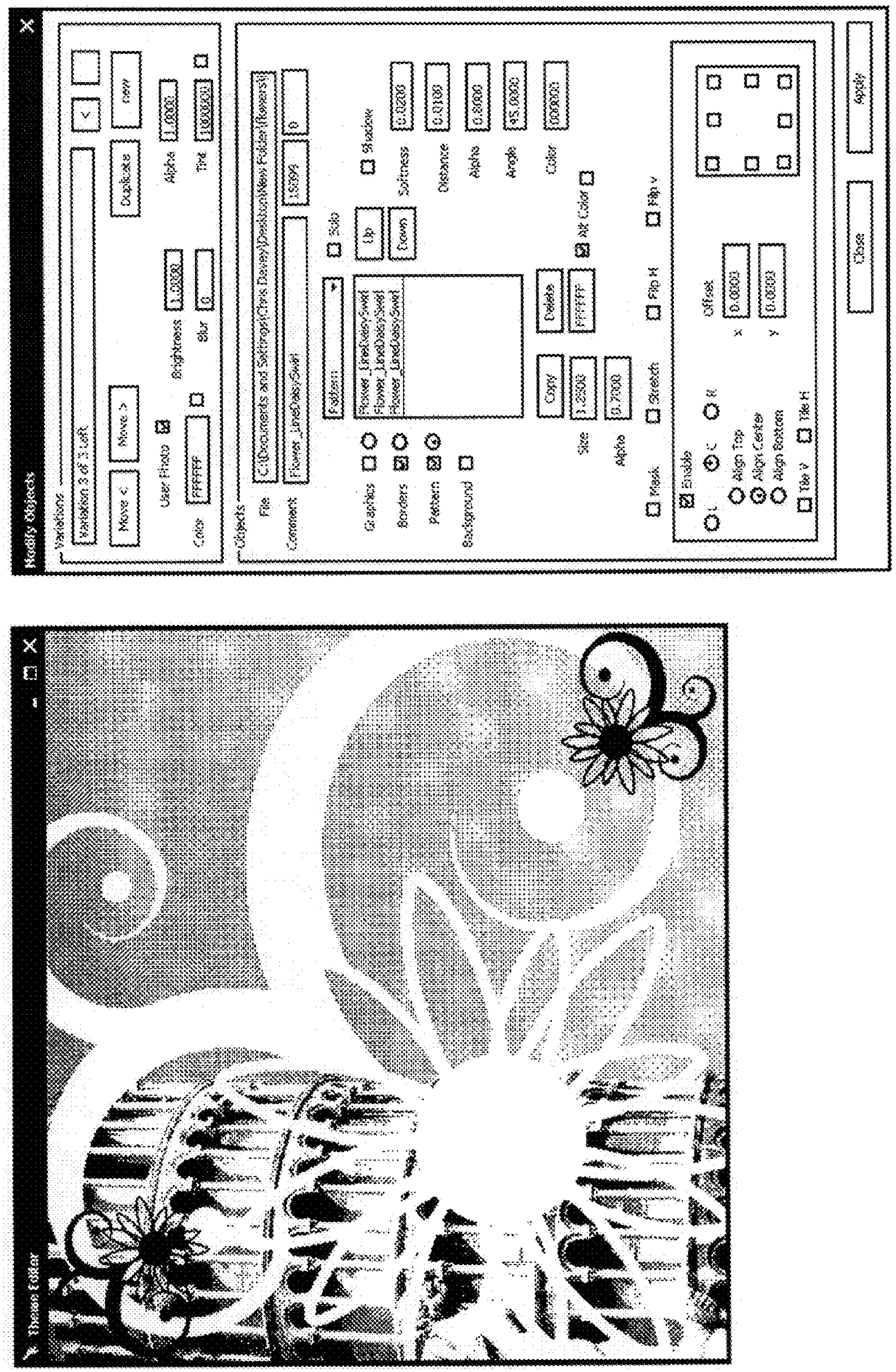

FIG. 29 is similar to FIG. 27, except that a placeholder photograph has been loaded and the "User Photo" preview option activated. The transparency of 0.7 set on the large graphic element in this example may let the photograph show through.

Figure 30:
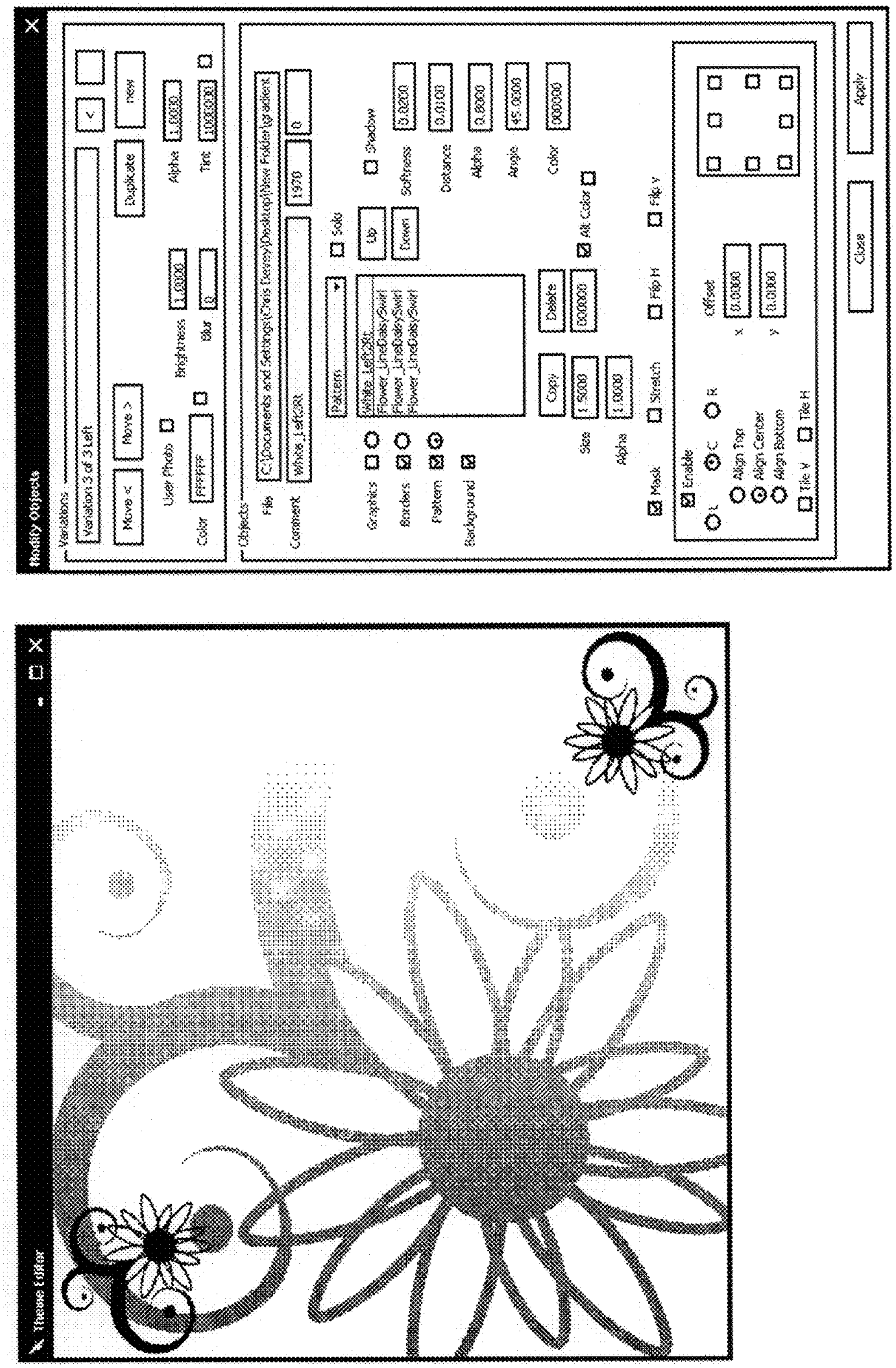

FIG. 30 is similar to FIG. 27, but a horizontal gradient mask has been added to the large graphic element and the "Mask" option activated. The gradient mask and transparency shown in FIGS. 20 and 21 may be combined.

Figure 31:
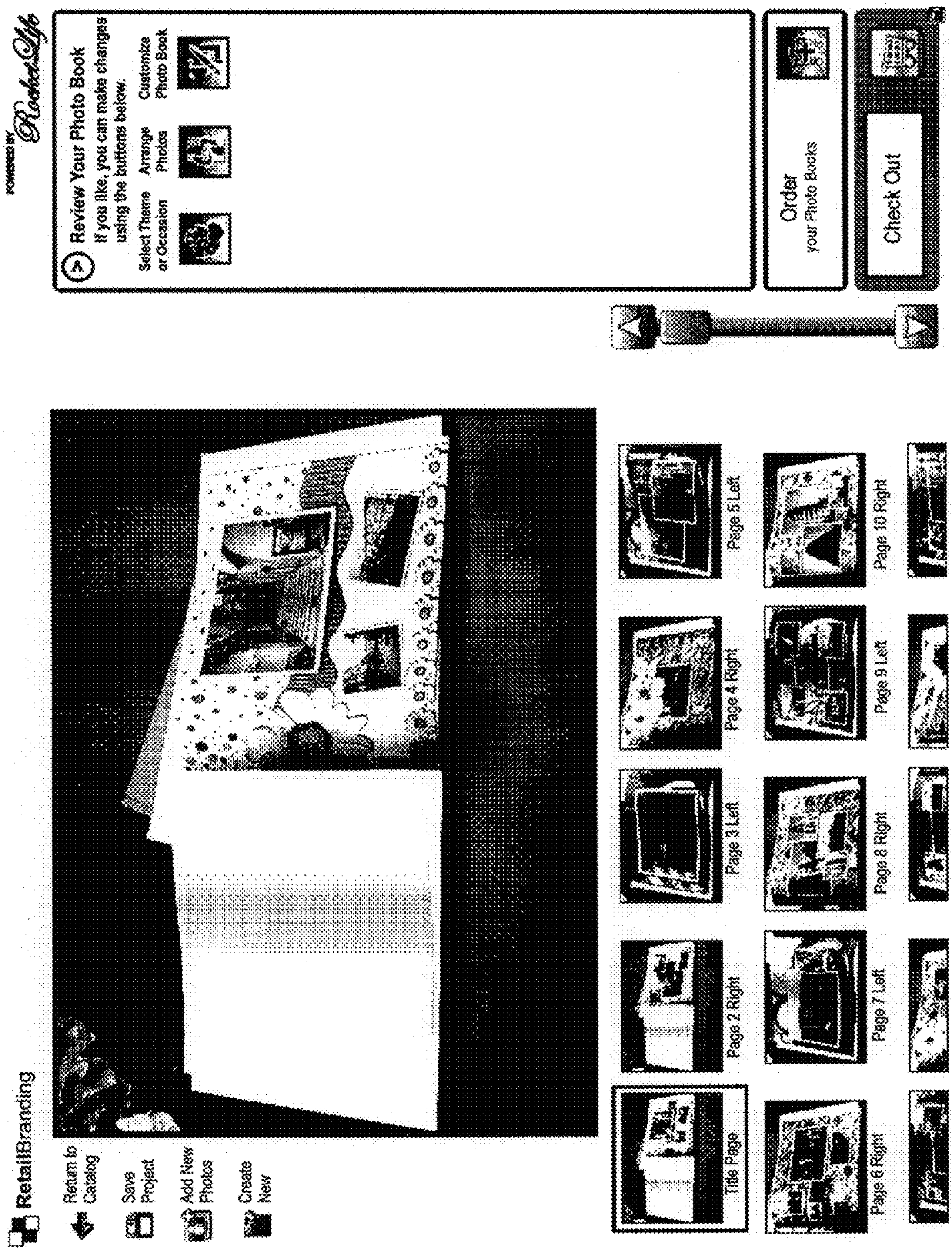

FIGS. 31 through 38 show an exemplary product preview and editing mode for use by an end-user. FIG. 31 shows a polka-dot/flower theme in a wide aspect book product. A photograph and the theme from FIG. 15-20 are shown. A photo book product has been chosen, with a wide aspect ratio, with the theme preview rendered accordingly.

Figure 32:
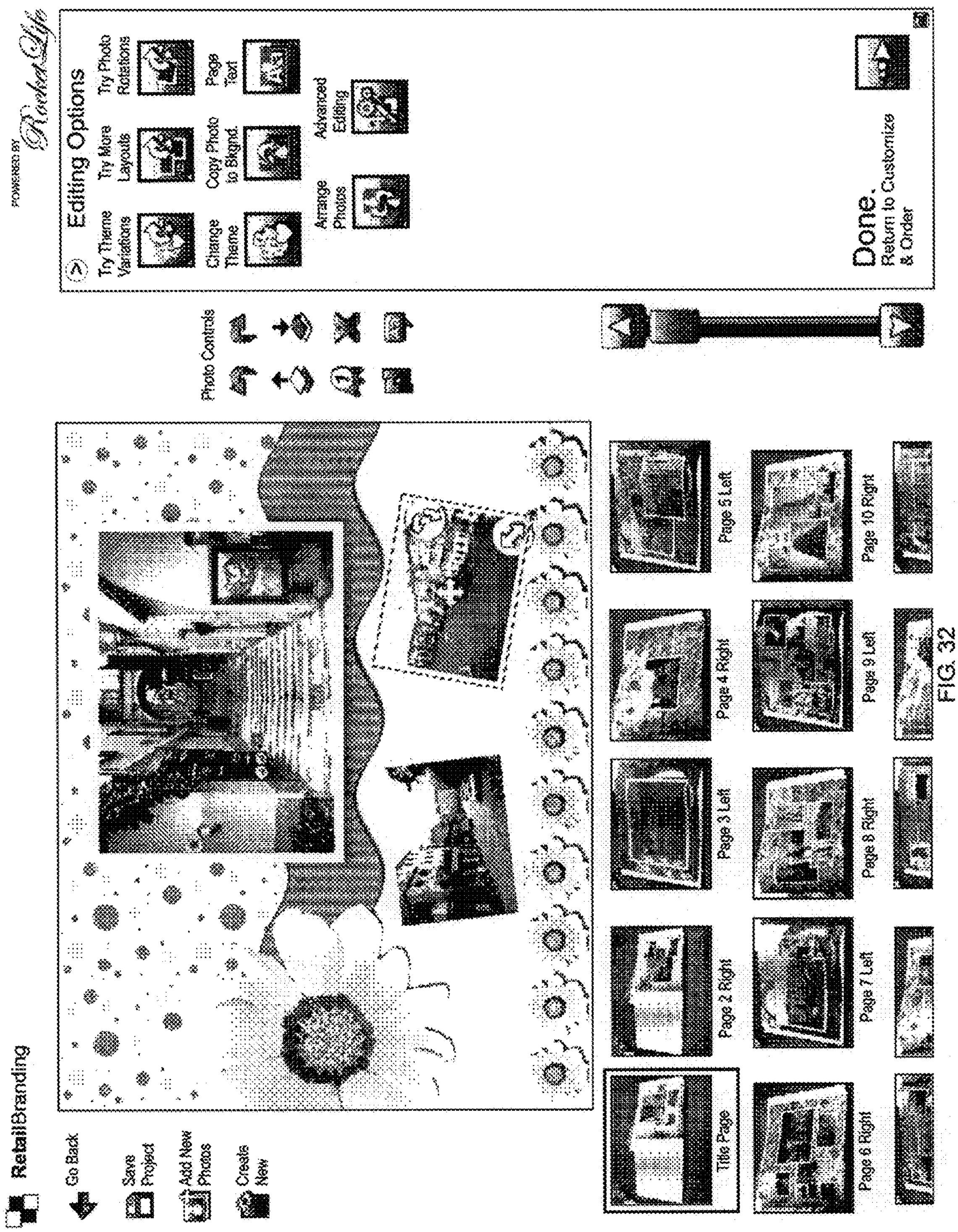

FIG. 32 shows the same product as FIG. 31, but an editing option has been selected with, a close-up of the page. A photograph has been automatically laid out on top of the theme content, but may be moved, sized and rotated as desired using the "handles" shown at the corners of the photos.

Figure 33:
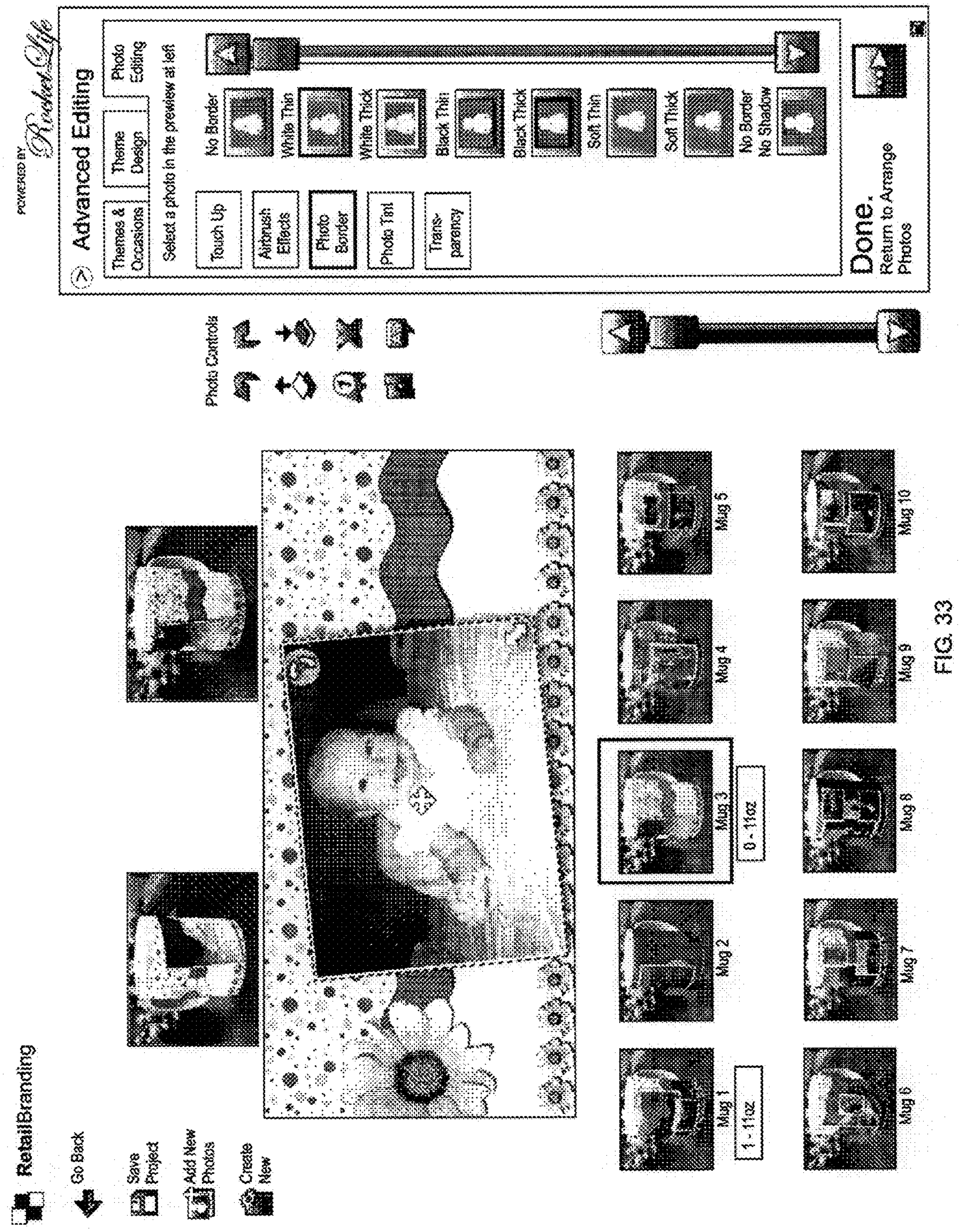

FIG. 33 shows the same theme as shown in FIGS. 31 and 32, but a coffee mug product has been selected and loaded with a different picture. The theme graphics here are repeating automatically, adjusting to fit a very wide aspect ratio image wrapped around the mug.

Figure 34:
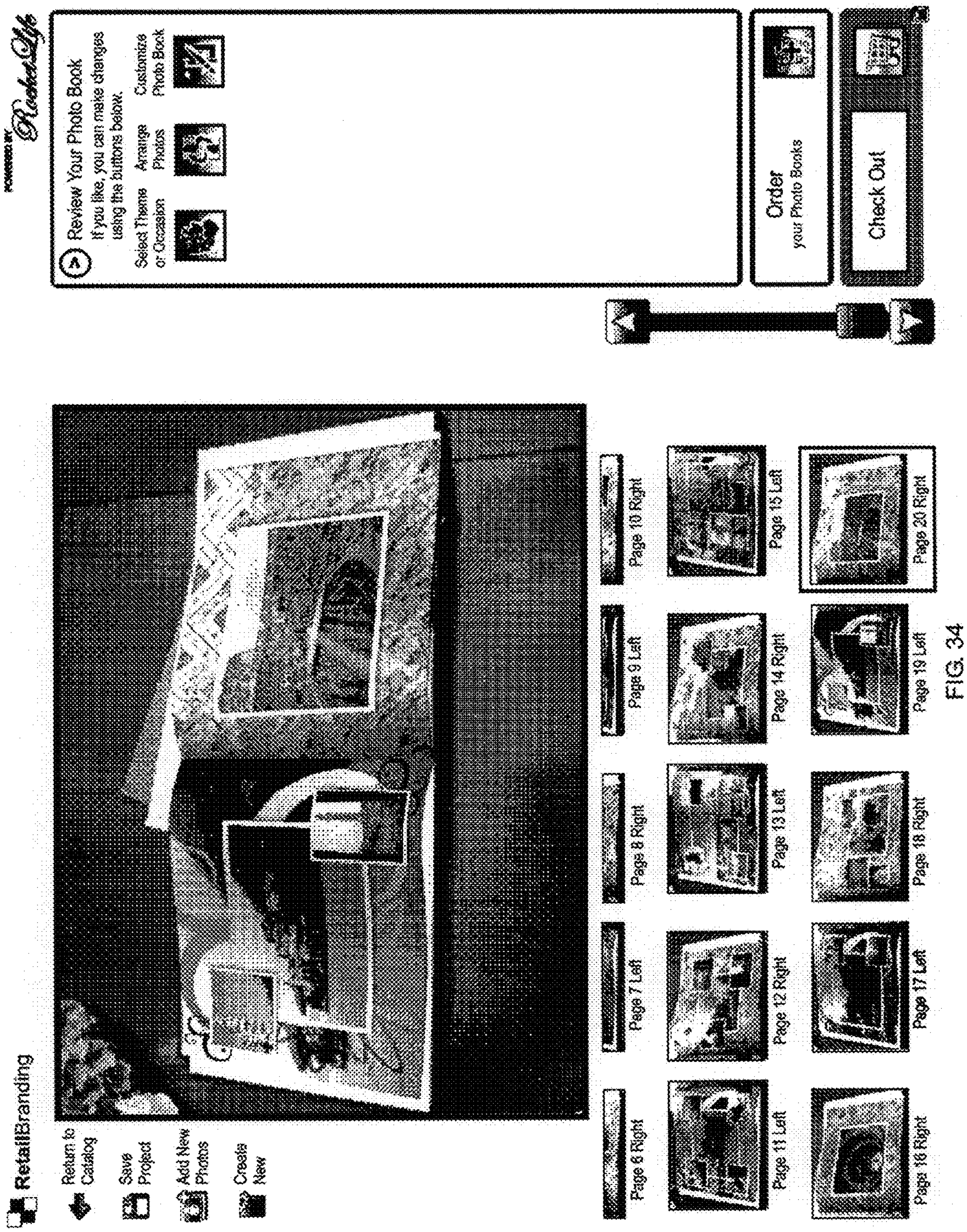

FIG. 34 shows the theme created in FIGS. 21-30 with two theme variations of a diamond pattern and curlicue graphics. Photographs have been placed on top of the theme content.

Figure 35:
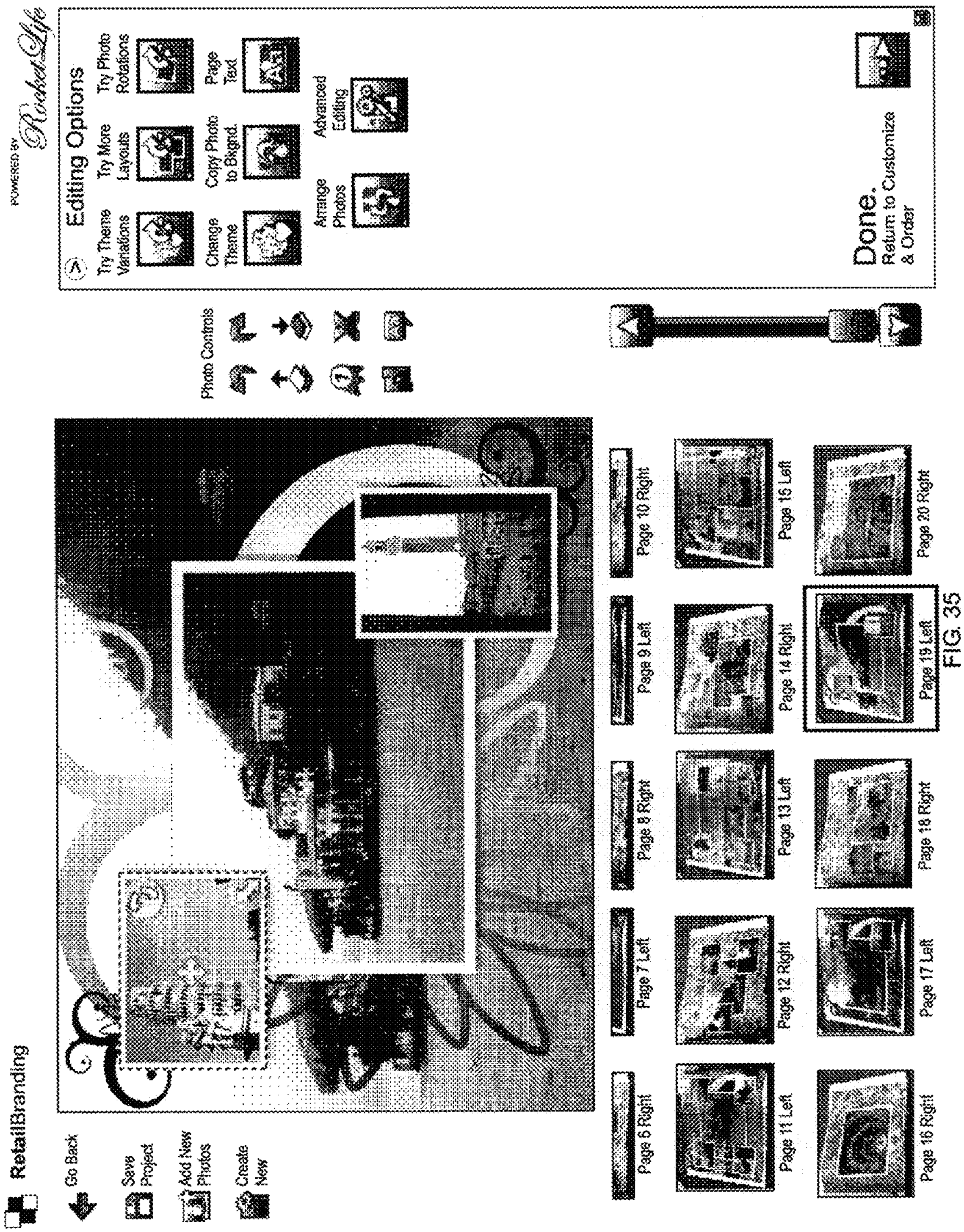

FIG. 35 shows an editing mode with a curlicue theme variation of FIG. 34 in a wide aspect book product. One of the user photographs shown here has also been placed in the background of the page, behind the transparent theme content. A gradient mask has been applied to the large graphic element and combined with the transparent overlay.

Figure 36:
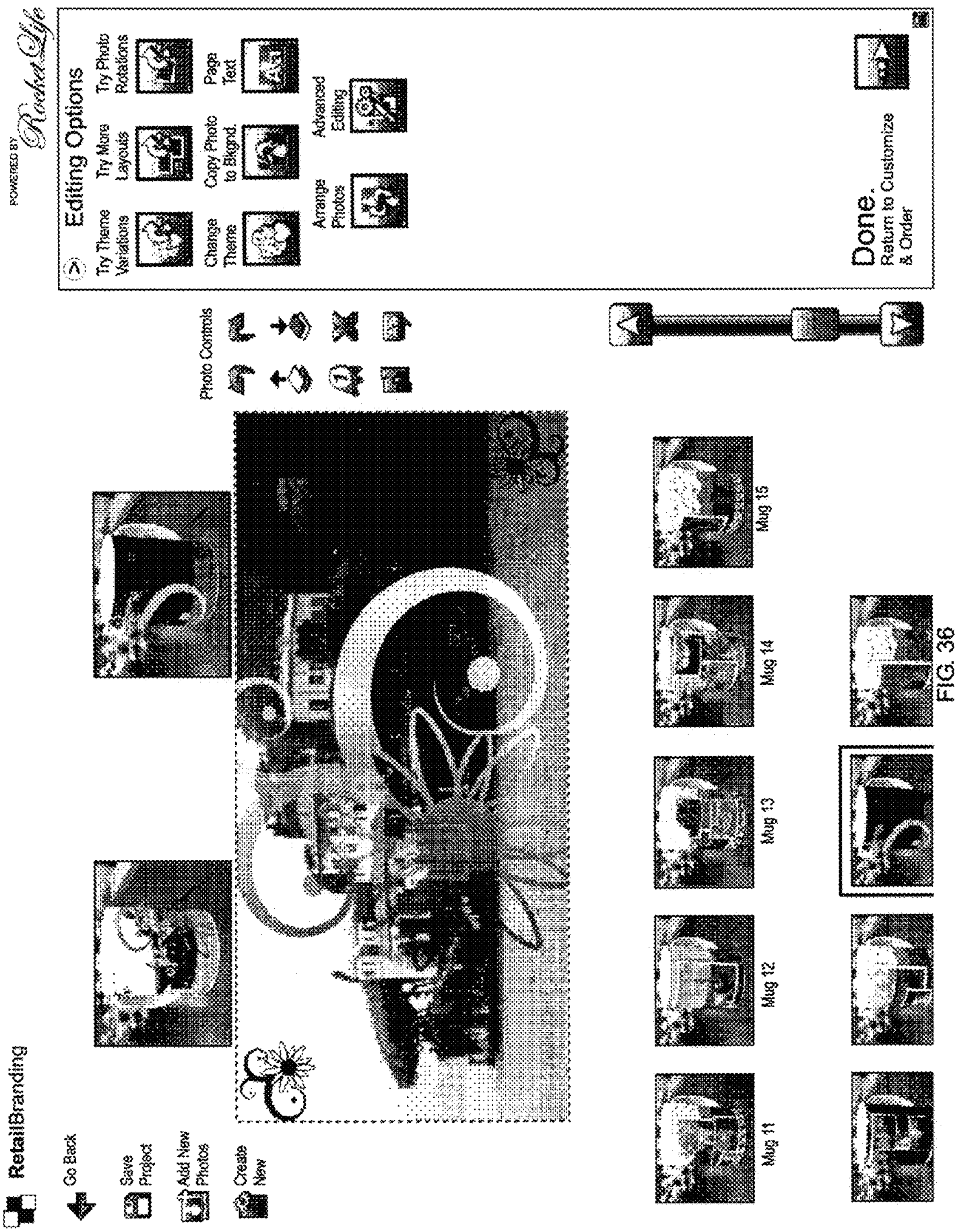

FIG. 36 shows an editing mode with a curlicue theme variation of FIG. 35, but in a very wide aspect mug product. The foreground photos may be removed, as shown, so the transparency and gradient on the large curlicue graphic may be more clearly seen. The curlicue elements in the corners have been automatically positioned appropriately to the very wide wrap-around aspect ratio of the mug print area.

The present invention has been described above with reference to exemplary embodiments. It will be apparent to those skilled in the art that various modifications may be made and other embodiments may be used without departing from the broader scope of the invention. Therefore, these and other variations upon the exemplary embodiments are intended to be covered by the present invention.

What is claimed is:

1. A method of rendering media for use with selected products, comprising:

providing a user interface for use in designing theme designs, wherein each theme design includes:
  a workspace having a print area, and
  an arrangement of graphic elements, wherein each of the graphic elements in the arrangement is associated with:
    a desired size of that graphic element relative to or the print area, and
    a rendering parameter that determines an appearance of that graphic element within the workspace or print area;

receiving an indication of a selected theme design, a selected product having the print area, and one or more images to be used with the selected product;

receiving an indication of an adjustment to the height and width of the print area from an initial aspect ratio to a resized aspect ratio;

rendering media for use with the selected product, including:
  determining a minimum value equal to a lesser of the adjusted height or adjusted width of the resized print area,
  adjusting the size and appearance of each of the graphic elements in the selected theme design to maintain its desired size relative to that of the print area and its aspect ratio independent of an aspect ratio of the resized print area by multiplying each of the height and width of the graphic element by the minimum value,
  displaying each graphic element by applying its rendering parameters to fit the resized aspect ratio; and displaying a preview of the selected product together with its print area including the one or more images and the graphic elements of the selected theme design as adjusted.

2. The method of claim 1, further comprising:

receiving, as a rendering parameter, an alignment display value;

receiving an offset value for shifting the graphic element alignment;

determining an alignment offset based on the offset value and the graphic element output height; and displaying the graphic element aligned according to the alignment offset.

3. The method of claim 1, further comprising:

receiving, as a rendering parameter, an alignment display value;

receiving an offset value for shifting the graphic element alignment;

determining an alignment offset based on the offset value and the graphic element output width; and displaying the graphic element aligned according to the alignment offset.

4. The method of claim 1, further comprising:

receiving, as a rendering parameter, a horizontal tiling option for the graphic element;

determining a repetition value for the graphic element based on the graphic element output width; and displaying the graphic element tiled horizontally according to the repetition value.

5. The method of claim 1, further comprising:

receiving, as a rendering parameter, a vertical tiling option for the graphic element;

determining a repetition value for the graphic element based on the graphic element output height; and displaying the graphic element tiled vertically according to the repetition value.

6. The method of claim 1, further comprising:

receiving, as a rendering parameter, a rotation value; and displaying the graphic element rotated according to the rotation value.

7. The method of claim 1, further comprising:

receiving, as a rendering parameter, a proportional size value for the graphic element; and displaying the graphic element sized according to the proportional size value.

8. The method of claim 1, further comprising:

receiving, as a rendering parameter, a color value; and displaying the graphic element colored according to the color value.

9. The method of claim 1, further comprising:

receiving, as a rendering parameter, an alpha-gradient value which determines an extent to which the graphic element is displayed progressively transparent across the graphic element; and displaying the graphic element progressively transparent according to the alpha-gradient value.

10. The method of claim 1, further comprising:

receiving, as a rendering parameter, an alpha-transparency value which determines an extent to which the graphic element is displayed proportionally transparent according to the alpha-transparency value; and displaying the graphic element proportionally transparent according to the alpha-transparency value.

11. The method of claim 1 wherein the graphic element comprises a photograph.

12. The method of claim 1, wherein the graphic element comprises a graphic data of the graphic element combined with an alpha-transparency data, wherein the graphic data comprises one or more of a vector data and a discrete cosine transform (DCT) compressed bitmap, and wherein the alpha-transparency data comprises one or more of a vector outline and a DCT compressed bitmap.

13. The method of claim 1, further comprising receiving a randomness value, and multiplying the randomness value by one or more of the rendering parameters to modify an operation of the one or more rendering parameters, and applying those one or more modified rendering parameters to determine the appearance of those graphic elements within the print area.

14. The method of claim 1, further comprising providing a user photo checkbox that allows a theme designer to define, for a particular theme design, that one or more user photos should automatically be inserted into the print area when creating a product with the particular theme design.

15. The method of claim 1, further comprising grouping a plurality of graphic element objects into different layers for use in the designing of theme designs.

16. The method of claim 1, further comprising providing a product preview and editing mode, for use by an end user, which receives from the end user a selection of the selected product from within a plurality of photo products, and a theme design to be applied thereto to be rendered and displayed with the selected product.

17. The method of claim 1, further comprising providing a product preview and editing mode, for use by an end user, which receives from the end user one of:

a selection of a first selected product, one or more theme designs, and one or more images to be rendered and displayed with the first selected product, and a selection of a second selected product, one or more theme designs, and one or more images to be rendered and displayed with the second selected product, and wherein the preview of a currently selected product is automatically adjusted to fit the print area of the currently selected product.

18. A system comprising:

a computing device including a processor, memory and storage;

a user interface for use in designing theme designs, wherein each theme design includes:

a workspace having a print area, and an arrangement of graphic elements, wherein each of the graphic elements in the arrangement is associated with:

a desired size of that graphic element relative to or the print area, and a rendering parameter that determines an appearance of that graphic element within the workspace or print area;

an aspect module configured to determine a size of an image on the print area while maintaining an aspect ratio of the image independent of an aspect ratio of the print area, including receiving, from an end user, an indication of a selected theme design, a selected product having the print area, and one or more images to be used with the selected product, receiving an indication of an adjustment to the height and width of the print area from an initial aspect ratio to a resized aspect ratio, determining a minimum value equal to a lesser of the adjusted height or adjusted width of the resized print area, and adjusting the size of each of the graphic elements in the selected theme design to maintain its desired size relative to that of the print area, its aspect ratio independent of an aspect ratio of the resized print area by multiplying each of the height and width of the graphic element by the minimum value, a rendering module configured to render media for use with the selected product, including applying the rendering parameters that determine the appearance of those graphic elements within the resized print area including, when the print area is resized from the initial aspect ratio to the resized aspect ratio, displaying each graphic element by applying its rendering parameters, to fit the resized aspect ratio; and a display module for displaying a preview of the selected product together with its print area including the one or more images and the graphic elements of the selected theme design as adjusted.

19. The system of claim 18, further comprising:

a graphics module configured to receive a graphic data of the graphic element; and an alpha module configured to receive an alpha-transparency data of the graphic element.

20. The system of claim 18, further comprising a randomness value that is multiplied by one or more of the rendering parameters to modify operation of the one or more rendering parameters, including applying the one or more rendering parameters as modified to determine the appearance of those graphic elements within the print area.

21. The system of claim 18, further comprising a user photo checkbox that allows a theme designer to define, for a particular theme design, that one or more user photos should automatically be inserted into the print area when creating a product with the particular theme design.

22. The system of claim 18, further comprising an interface for grouping a plurality of graphic element objects into different layers for use in the designing of theme designs.

23. The system of claim 18, further comprising a product preview and editing mode, for use by the end user, which receives from the end user a selection of the selected product from within a plurality of photo products, and a theme design to be applied thereto to be rendered and displayed with the selected product.

24. The system of claim 18, further comprising a product preview and editing mode, for use by the end user, which receives from the end user one of:

a selection of a first selected product, one or more theme designs, and one or more images to be rendered and displayed with the first selected product, and a selection of a second selected product, one or more theme designs, and one or more images to be rendered and displayed with the second selected product, and wherein the preview of a currently selected product is automatically adjusted to fit the print area of the currently selected product.

25. A non-transitory computer readable medium having embedded thereon a program, the program being executable by a processor for performing a method of rendering media for use with selected products, the method comprising:

providing a user interface for use in designing theme designs, wherein each theme design includes:

a workspace having a print area, and an arrangement of graphic elements, wherein each of the graphic elements in the arrangement is associated with:

a desired size of that graphic element relative to or the print area, and a rendering parameter that determines an appearance of that graphic element within the workspace or print area;

receiving an indication of a selected theme design, a selected product having the print area, and one or more images to be used with the selected product;

receiving an indication of an adjustment to the height and width of the print area from an initial aspect ratio to a resized aspect ratio;

rendering media for use with the selected product, including determining a minimum value equal to a lesser of the adjusted height or adjusted width of the resized print area, and adjusting the size and appearance of each of the graphic elements in the selected theme design to maintain its desired size relative to that of the print area and its aspect ratio independent of an aspect ratio of the resized print area by multiplying each of the height and width of the graphic element by the minimum value, displaying each graphic element by applying its rendering parameters to fit the resized aspect ratio; and displaying a preview of the selected product together with its print area including the one or more images and the graphic elements of the selected theme design as adjusted.

* * * * *

UNITED STATES PATENT AND TRADEMARK OFFICE

CERTIFICATE OF CORRECTION

PATENT NO. : 8,707,173 B2
APPLICATION NO. : 12/156321
DATED : April 22, 2014
INVENTOR(S) : Michael R. Moore et al.

It is certified that error appears in the above-identified patent and that said Letters Patent is hereby corrected as shown below:

In the Claims

At column 15, line 27, in Claim 1, replace "relative to or the print area" with -- relative to the print area --

At column 17, line 33, in Claim 18, replace "relative to or the print area" with -- relative to the print area --

At column 18, line 52, in Claim 25, replace "relative to or the print area" with -- relative to the print area --

Signed and Sealed this
Fifth Day of August, 2014

Michelle K. Lee

Michelle K. Lee
*Deputy Director of the United States Patent and Trademark Office*